(12) United States Patent
Yett

(10) Patent No.: US 9,576,377 B1
(45) Date of Patent: Feb. 21, 2017

(54) INDIVIDUALLY ANGLED MIRROR ARRAY SYSTEM SPECIALTY EFFECTS

(71) Applicant: James Yett, San Jose, CA (US)

(72) Inventor: James Yett, San Jose, CA (US)

( * ) Notice: Subject to any disclaimer, the term of this patent is extended or adjusted under 35 U.S.C. 154(b) by 482 days.

(21) Appl. No.: 13/776,622

(22) Filed: Feb. 25, 2013

Related U.S. Application Data

(60) Provisional application No. 61/602,596, filed on Feb. 24, 2012.

(51) Int. Cl.
*G06T 11/00* (2006.01)

(52) U.S. Cl.
CPC .................................. *G06T 11/001* (2013.01)

(58) Field of Classification Search
CPC ... G02B 26/0833; G02B 26/105; G02B 5/124; F21V 7/0083
See application file for complete search history.

(56) References Cited

U.S. PATENT DOCUMENTS

| 4,696,554 A * | 9/1987 | Seawright | G02B 5/124 359/851 |
| 2011/0032365 A1 * | 2/2011 | Yett | G02B 27/2235 348/207.1 |
| 2014/0022222 A1 * | 1/2014 | Kuo | G02B 5/021 345/205 |

* cited by examiner

*Primary Examiner* — Priyank Shah

(57) ABSTRACT

A general purpose image and visual effects display apparatus, with associated methods, which is comprised of an array of independently angled reflective or refractive elements wherein the varying angle pattern of each element across said array is designed to reflect or refract specifically designed light and color sources as well as fortuitously located existing colors, in precisely determined patterns, to make apparent to designated viewing or receiving locations a wide range of complex visual effects.

12 Claims, 28 Drawing Sheets

FIG. 5
A
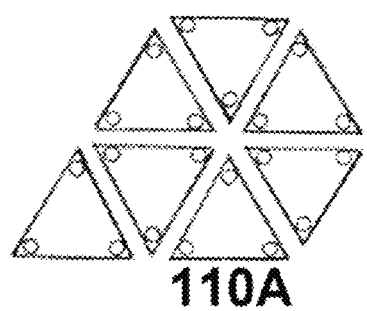
110A
B
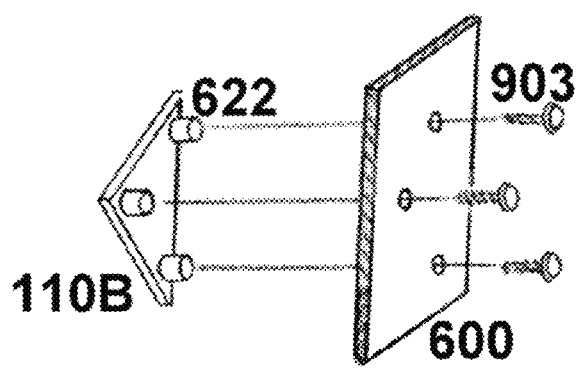

FIG. 7
A
100
B
3
1
4
2
241
C 
310

FIG. 8
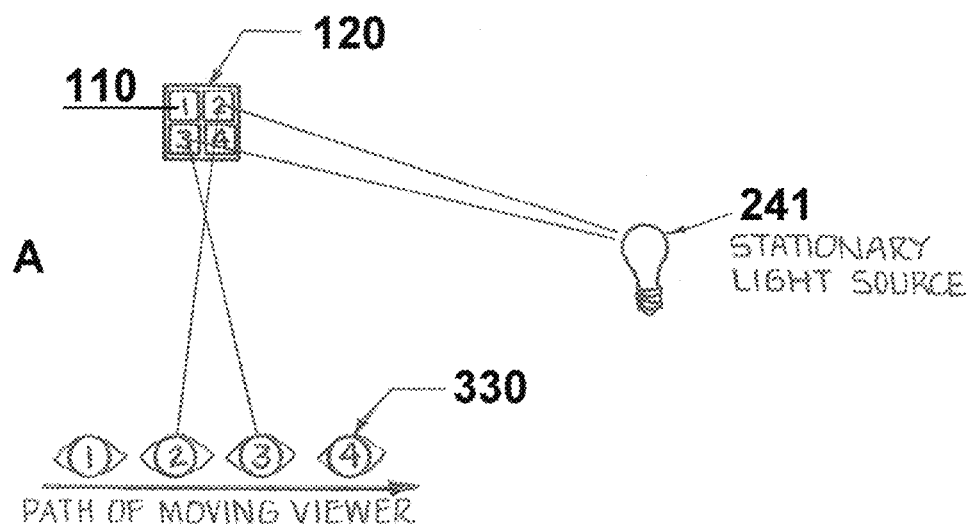
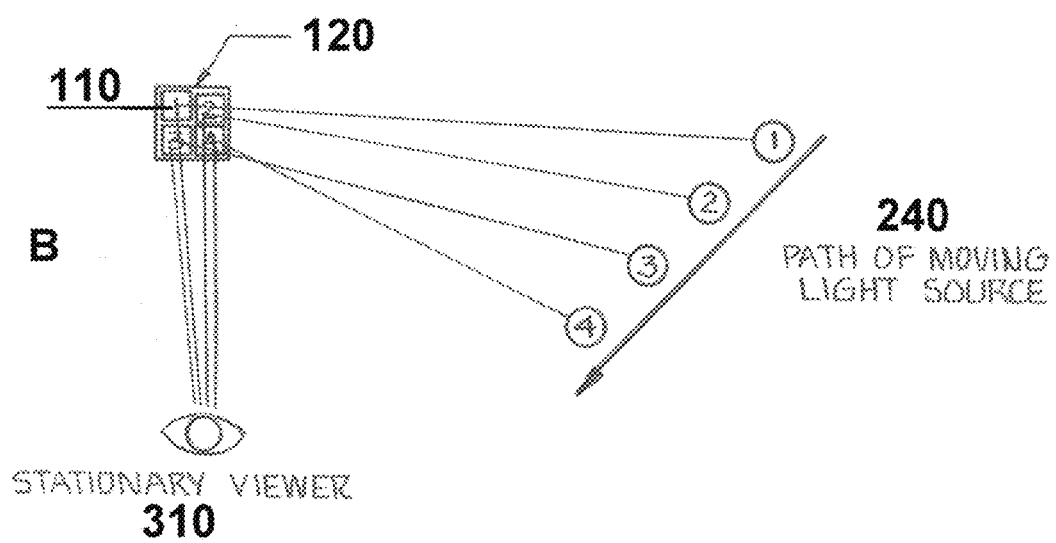

FIG. 12
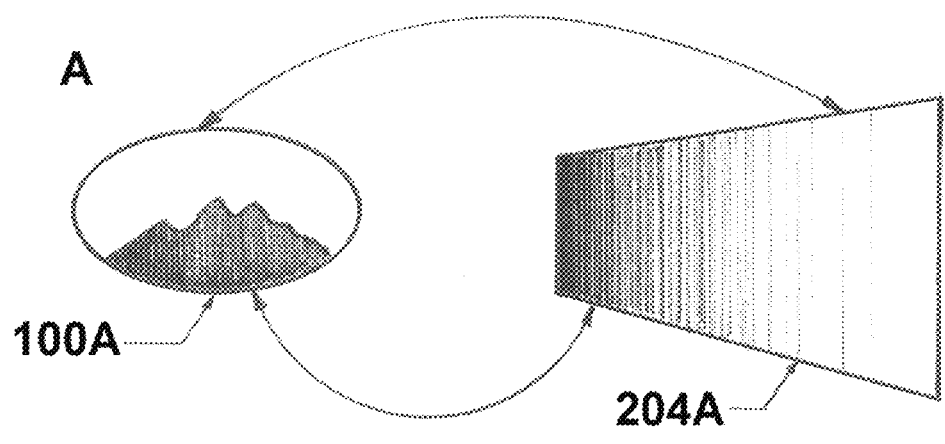
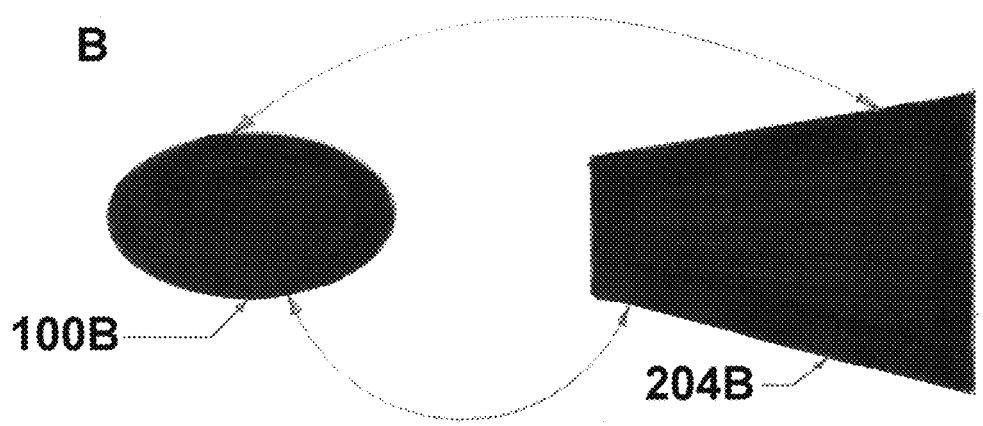

FIG. 13
A 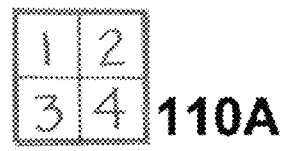 110A
B 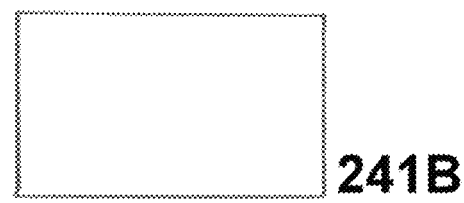 241B
C 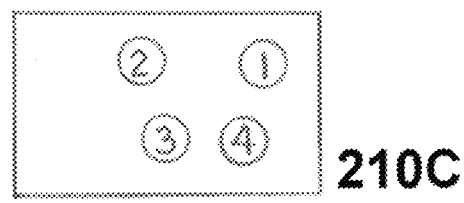 210C
D 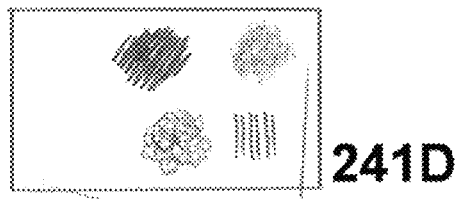 241D
E 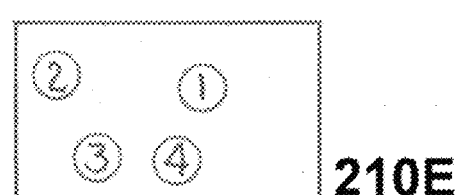 210E

FIG. 14
A
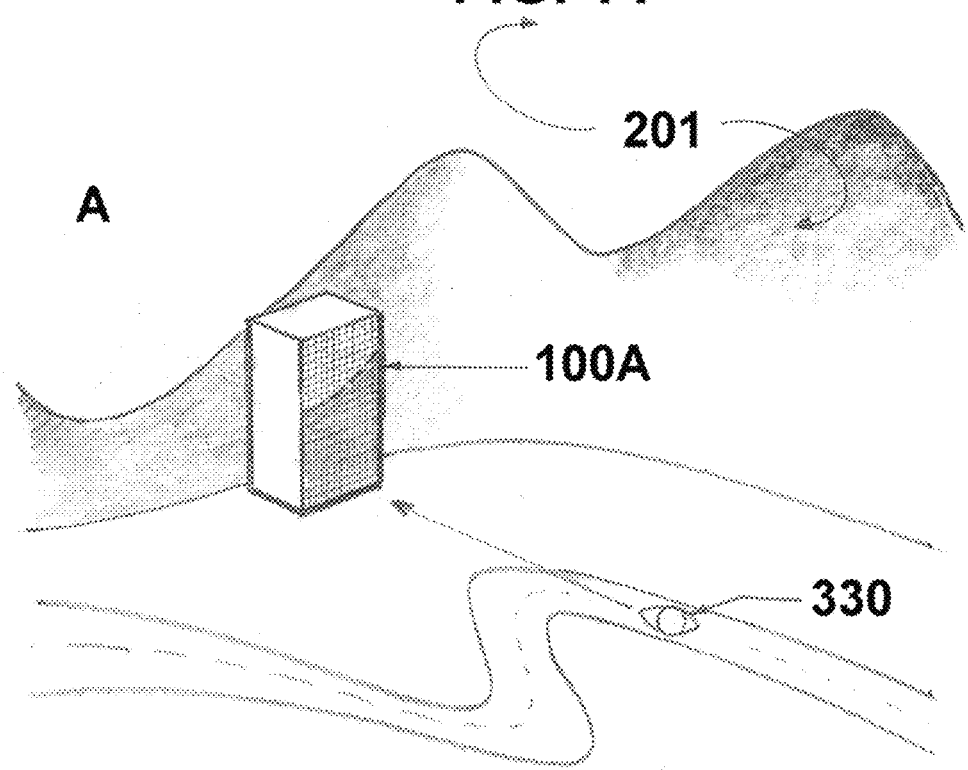
201
100A
330
B
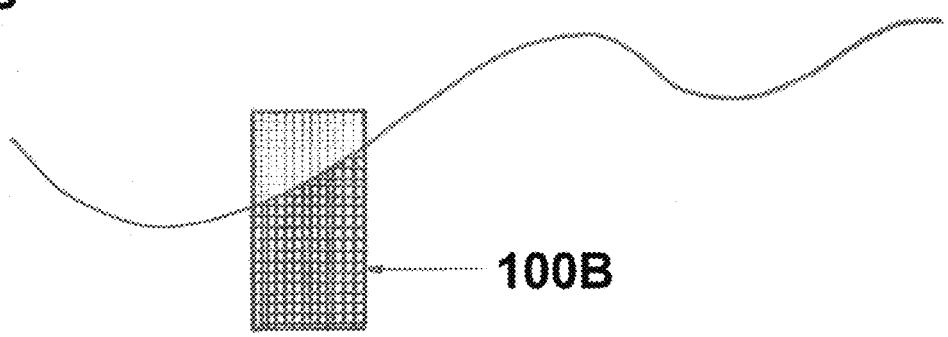
100B

FIG.18
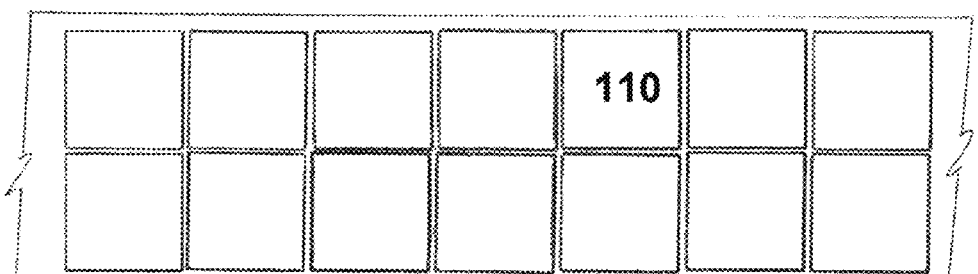
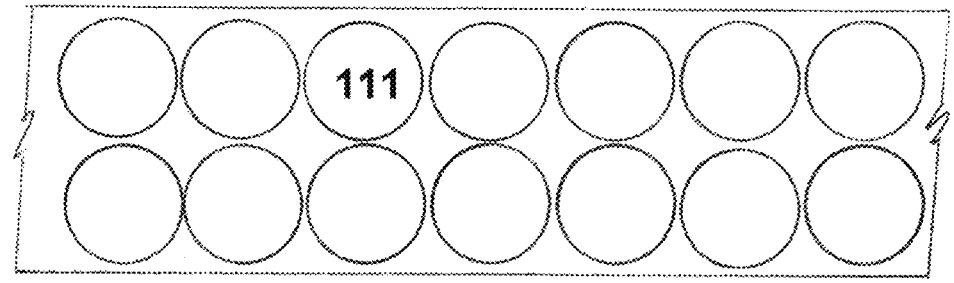
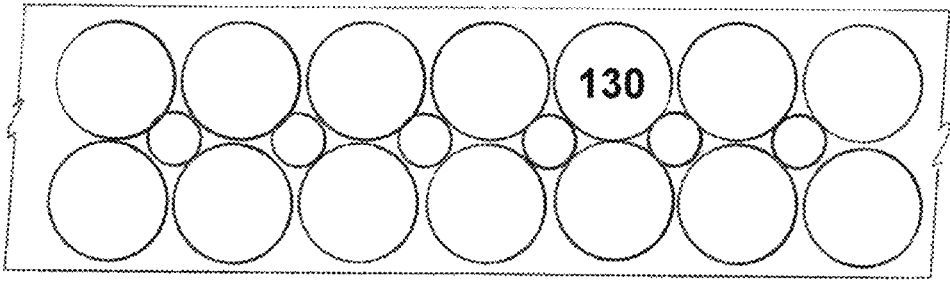

FIG. 21
100A     100B     100C
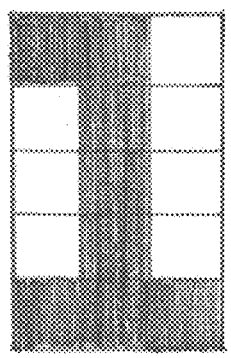
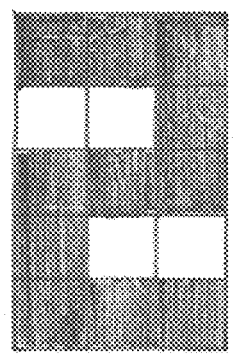
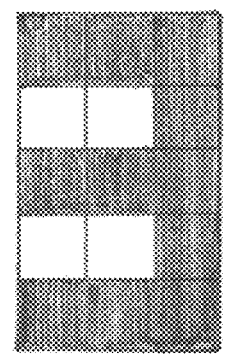
200A 
200B 

FIG. 22

| | | |
|---|---|---|
| BBB | BBB | WBB |
| WWW | BWW | WBB |
| WBW | BBB | WBB |
| WBW | BWW | WWB |
| BBB | BBB | BBB |

A

B  BBB
BWW
WBB
WBW
WWB
WWW

FIG. 24
A  100A
 310A
B  100B
310B  230B
C 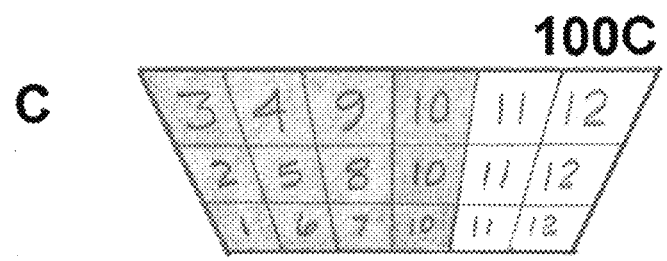 100C
310C 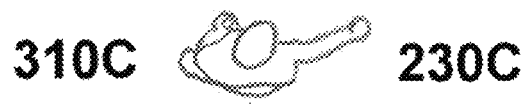 230C

FIG. 27
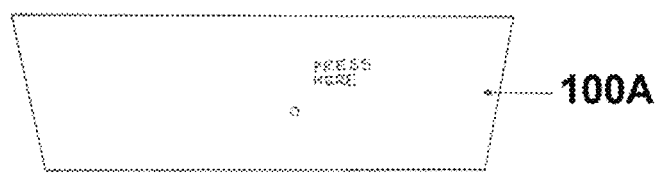
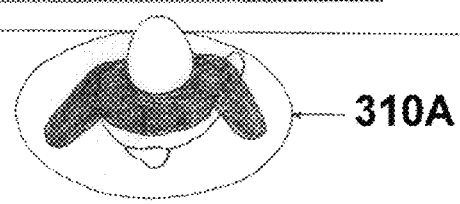
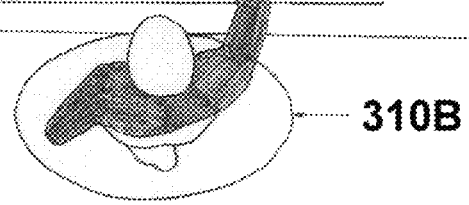

INDIVIDUALLY ANGLED MIRROR ARRAY SYSTEM SPECIALTY EFFECTS

PRIORITY CLAIM

This application claims the benefit under 35 USC 119 to U.S. Provisional Patent Appl. Ser. No. 61/602,596, filed on Feb. 24, 2012 and titled "Array of Individually Angled Mirrors—Specialty Effects, Methods and Systems", the entirety of which is incorporated herein by reference. This application is also a continuation in part of and claims priority under 35 USC 120 to U.S. patent application Ser. No. 12/799,553, the entirety of which is incorporated herein by reference.

FEDERALLY SPONSORED RESEARCH

Not applicable.

SEQUENCE LISTING OR PROGRAM

Not applicable.

FIELD

These inventions relate to structures for representing full color images, animation, 3D graphics and other visual effects, and particularly to structures comprising a plurality of tile elements which reflect or refract light and the color reflection sources which are optionally organized in conjunction with or tracked and cataloged to be reflected by said array, to construct said visual effects.

BACKGROUND

Prior Art

There is no known prior art aside from the prior art cited in the application Ser. No. 12/799,553 cited above, which has been incorporated herein by reference.

SUMMARY

Each reflective tile in a mirror tile array as described herein is, in several embodiments, functionally a pixel. A mirror tile pixel's color is dynamically changeable by changing the reflection vector from viewer to mirror to color source. Full control over color of each pixel/mirror is possible by giving each mirror its own dedicated reflection color source, which is possible by angling each mirror so that it reflects a different position in space, at which is located or can be placed any color source. With control over the color of each mirror/pixel, comes complete control over the entire image. Any image can thus be presented with this method, up to the resolution of the given mirror array, which by means of various standard fabrication technologies, is potentially a very high resolution.

Mirror tile angles can be configured with precise consideration of the colors constellated in the reflected environment of the mirror array, to invoke a wide range of image effects. For example, a given city scene can be reflectively translated into a photo-realistic portrait, or a mountain scene, etc. Still more diverse effects are possible when the colors and patterns in the reflected environment are specifically devised and mapped out into a usefully reflectable image construction pattern, and then set into reflectable position, in conjunction with the designation of specific mirror angle arrangements.

A random preexisting set of color patches that might exist in a given environment can be reflectively re-ordered into any image whose palette is a subset of that given color set—or can be mixed from those ambient colors. To construct an image, each mirror tile in the grid must be specifically angled based on the spatial position of each required color in the environment, the desired constructed image, and the position of the viewer of the resulting reflectively constructed image. To maximize available display color range, with a given limited available reflectable palette, groups of mirrors can be treated as "sub-pixels", or color channels, (and optionally freely sized in relation to each other), to mix colors. Mirror pixels can also be divided into other types of "Sub-pixels", where each mirror pixel, or the reflective functionality at each pixel location, is divided into differently reflecting subunits, for various viewing effects.

If, for example, in a given intended display image the 327th mirror/pixel in the 44th mirror/pixel row must be a specific light shade of orange, to become a tiny section of an image of an orchard, then that mirror tile must be angled, with respect to the viewer, toward a suitably shaded orange colored object somewhere in the reflectable surroundings of the mirror array, and so must all other pixels that form a tangerine. The various necessary shades of orange may be reflected from different points in the surrounding environment, and the many mirror tiles that together construct the tangerine in reflective view may all be angled in slightly or distinctly different directions or, equally, many or all of them could be angled toward just a few specific color sources, perhaps seven different shades of orange. If no orange color sources exist in the environment of the reflective display, then it may not be possible in that location to reflectively construct an image of a tangerine. There would, however, remain the option of reflecting yellows and reds with groups of adjacent mirror tiles, to mix these two colors to thereby derive the required orange shades to represent a tangerine. If no suitable mix colors are available in the reflectable environment, then an object or swatch of suitable orange, or colors mixable to produce orange, could be purposefully introduced into the scene, to augment the existing color set. Some reflective grid displays are constructed solely from existing colors, and some are constructed solely from custom-devised and introduced colors, color patterns and assemblages, and some from a mixture of existing and introduced color sources. Reflectable colors and color patterns the shapes of which are designed specifically for the purpose of being reflectively reconstructed into mirror grid images can be engineered both independently of the angle settings of the presentation mirror grid, or can be designed in conjunction with the mirror grid in order to present many image effects that are not possible when reflecting only ambient colors. While both the angled mirror array angles and the source color patterns are each widely configurable alone to produce various visual effects in reflection, the parameters of both of these, when adjusted in conjunction, enable effects not possible when setting the parameters of each of these in isolation.

The display types possible with this angled reflection array and designed source graphics system include still images, multiple different still images displayed simultaneously to different viewing positions, animation of various types, interactive visual effects based on the viewer's own presence in the reflectable environment being used as source colors to present to said viewer, and various other visual effects.

There are embodiments of the invention not based on static mirror arrays and static reflection sources, and in these the animation or other interactive effects are not under control solely of the viewer's movement relative to the mirror array, or other relative movement between viewer, mirror array and reflected graphics. In these other embodiments further interactive elements are supported by dynamic control of elements of the system, such as movement of the mirror array as a whole, movement of sections of it, control of individual mirror angles, movement of the reflected color source or parts of it or the use of a computer display or other programmable or moveable media as the color source.

The images presented by this system are visible only from specific viewing areas, where all the prescribed tile reflections are designed to converge. The image viewing area can be small, or large, or irregularly shaped, and there can be more than one viewing area per display, each viewing area being shown a different image, animation or effect and size. The reflection reference colors that are reflected toward the viewing area or areas can be reflection-gathered from many directions, or can be reflected from a small contiguous area, such as from a small prepared source graphic of tightly packed colors and patterns that support a given effect.

Some embodiments of the invention rely solely upon colors in the surrounding environment, and do not introduce any additional color sources. The first step in designing mirror arrays that will extract images from the environment is to determine the existing colors in the environment and then compile them into a list. This palette must list, minimally, not just the specific colors situated in the environment but also the mirror angle settings at which they are available with respect to the mirror array position. This is the basis for setting the angles of the mirror tiles to construct an image and direct a given color toward a given viewing position in that given environment. In computer graphics when a given pixel needs to be designated as turquoise, for example, the appropriate RGB (Red-Green-Blue) primary color levels are assigned to that pixel. To designate a pixel/mirror tile as turquoise in a reflective mirror grid context, instead of assigning RGB levels, reflection angle settings are assigned to each mirror tile. The angle settings of all locally available reflective colors will, generally, have been determined prior to the design of the given image, to confirm that the all colors necessary to construct that image are reflectively available.

Especially important and useful for designing reflectively presented images is the exact size and shape of each color source. Size of a color source determines the size of the viewing area of the reflection of that color. When a color is present in the environment, or is placed into the environment, as a wide reflectable swatch, from the perspective of the viewer looking at the color through the reflection surface, and a given mirror tile targets that swatch toward a given viewing position, that color will be visible in that tile from a wide viewing area. If all color reflection sources for a display image are such large swatches, the viewing area will be large with respect to the entire image. Likewise, for reflectively constructed images that target small color source swatches. Reflectively targeting these will result in an image viewable from a correspondingly narrow viewing area.

There can be different color source swatch sizes for different parts of a given image, and therefore different viewing area sizes for those different parts of the image. For example, most of an image of a house can be constructed of wide viewing angle colors, while at the same time the window panes of the house's windows are constructed of narrow viewing angle colors. This allows a viewer of the image to move within a wide area and see the image of the house and windows, though the windows will be blank. The viewer can then move into a small sub-section of the wider viewing area from which to see colors and images in the windows. Each separate window's content can, also, become visible from a different area within the wider viewing area. If all colors in a given image are referenced from very small swatches, then the entire image's viewing area will be very small.

The general display principles and variations described can all be constructed by hand, mirror tile angle by mirror tile angle, though any but the most simple displays would in practical circumstances preferably rely upon computer and software assistance to perform the many iterations of simple math operations required.

Angled Mirror Tile Compared to Pixel

Though a mirror tile shares the basic pixel nature of being a "picture element", it is functionally different in several respect, beyond being lit by reflected light instead of by emitted light. Those differences between pixel and mirror tile include:

Reflective: A pixel is active, emitting light, while a mirror tile is passive, reflecting light, though it can optionally be active in the sense of being dynamically targeted, motorized, or can reference an active source such as an interactively or otherwise dynamically controlled computer display. It can even "shine" light, like a pixel, but only when, still, reflectively referencing a light source, in a array partially or wholly based on radiant light source reflection references.

Not just pure color: A mirror tile's referenced color source can be a pattern, static or moving, and that pattern can present unusual pixel features such as lateral movement and other texture source manifestations, especially when several contiguous mirror tiles target patterned color sources, either static or moving.

Free-form and varying parameters: Mirror tile pixels can be of arbitrary shape and size, color space, number of sub-pixels—and these parameters can vary freely within a given display.

RGB-based, or based on any other component color scheme: A pixel in a computer display is typically composed of primary color sub-pixels (RG and B), whose proportional intensity gives the display's full color gamut. Any color can be a native primary for a mirror tile, precluding the absolute need for sub-pixels. In other words, the primary colors for a mirror tile display can be 10,000 distinct colors, precluding the need to mix colors using sub-pixels. Equally, mirror tile displays can use sub-pixels based on any alternative to RGB, like CMYK, or any other custom collection of colors optimized to mix the shades necessary for a given display image.

Interactive: Mirror tile reflection sources can be the image viewer him or herself. Coloration and even the shape of a presentation image can be directly interactive in this way.

Display manipulated by viewer movement: The presentation image can be a static image that does not change in response to viewer movement, but there are also several types of animated and active mirror tile displays that are animated or visually adjustable in various ways and these image changes can be a function of viewer movement. Image manipulation can be invoked by viewer movement along the presentation image's viewing path, and this manipulation is often the control of image animation. Image manipulation can be also be invoked by a stationary viewer making changes to the reflectable color environment, such as by moving his arms or legs, or by holding colored cards in various positions (like semaphores), to cause particular visual effects to appear in reflection. Multiple individuals in a given reflectable environment can be required to move in prescribed positions and patterns to allow images to become reflectively visible.

Freely configurable viewing angle: Mirror tile viewing angle is very configurable, to any shape and size. Viewing angle can be very tight, or very wide and even broken into several different view areas, each with its own viewing angle. Tight viewing angle displays can be advantageous for privacy and security applications, for example, and wide angle displays for inclusiveness in viewing not possible with some other types of image displays.

Variable size: Mirror tiles can be very small, supporting extremely high resolution images, and can also be constructed of very large elements, at very large scale.

A key feature of a mirror tile is that its color is physically separated from it. The angle of a mirror tile is, essentially, its color setting and that is all that ties it to its color. The mirror tile being abstracted away from its chief attribute, its color, gives rise to one of its chief abilities, the image transformations that can be presented by a mirror tile array, which can be compared to mathematical matrix transformations, versatile and useful beyond specific image extractions, extending to general purpose image effects. The versatility of the possible transformations multiplies further in specialty embodiments when mirror tiles reference further mirror tiles, or reference programmatically controlled graphics, or are under mechanical control or are otherwise articulated.

The color angle of a given color to be reflected from the environment varies with the position of the given mirror tile across the array. A mirror tile in the top right of an array will need a different angle setting in order to reference the same color as a mirror tile on the opposite side of the array.

A by-hand process of determining the mirror tile angle settings required for a given image display in a given color environment, and then setting them to the thousands of mirror tiles in a given array, can be illustrated if we assume a mirror array with tiles that can freely pivot and be set by hand. The configurable angles of mirror tile arrays can be manufactured in many ways, and freely configurable mirror tiles are certainly not the least expensive, and are used here just for illustrative purposes. Two technicians, working in tandem, can perform the angle determination task, and set the angles to each mirror tile, though the task is very laborious. For this illustration we'll use a simplified case of 10×10 mirror tile array. One person is at the viewing location, and is referring to a reference print of the desired presentation graphic, in which is identified the color of each individual pixel, of which in this case there are 100 (10×10). Our demonstration graphic will be the letter "A". That graphic has been converted to the exact resolution of the tile array and its palette has been constrained to the available reflective environment palette. In our instance the only necessary colors are black for the letter and light blue for the letter background. Each of the 100 array mirrors is perhaps numbered, or at least easy to locate on the grid. The color of each pixel is also perhaps numbered, to assist in the targeting. The person at the viewing position calls out a pixel number and its designated color. His collaborator, whose job it is to physically target the mirror tiles, then locates that numbered mirror tile, and aims it so as to reflect the appropriate color source, wherever it exists in the surrounding environment or in the available color source graphic, back to the viewer. When successfully aimed, the proper color reflection will be apparent to the first technician, and the process then proceeds to the next mirror tile (i.e., pixel). After 100 iterations of this process, the letter "A" is visible in the mirror array from the given viewing position, roughly identical to how it appears in the reference print.

Both these functions could be automated using simple devices. A color sensor at the viewing position could work in tandem with a device that articulates a mirror at each mirror tile location, methodically scanning back and forth across the reflectable field. When the proper color is reflected for the given mirror tile position, the color sensor will see it, and the position of the mirror can be noted and the process repeated for another mirror tile position.

A window can be configured with a refractive (as compared to a reflective) tile array that translates a given outdoor scene into any arbitrary other image (as long as it uses a palette subset of the existing scene). A series of windows can thus present a gallery of different images all refractive tile array-derived from one existing outdoor tableau.

Instead of reflecting areas of passive color, lit by unmodified ambient light, the reflection sources of a reflectively constructed image can be purposefully lit by a controllable light source. By controlling the illumination source, an "action" can be performed to give a desired visual result in the constructed image. The controllable light source can act on the display image by affecting the lighting of a reflected color surface, or it can act on the image by being directly reflected. When a reflector's color source is the direct reflection of an emissive light source (or, a particularly brightly lit surface) it can present the same amount of reflectable light through small mirrors which only tile a fraction of the plane, as is presented through mirrors that completely tile the plane and reflect only ambient light.

Ambient lit displays can be optionally modified by active lighting. There are many possible reasons to do this. These include compensating for variations in ambient illumination, color toning all or parts of an image, calling attention to elements of an image (and many other possibilities).

When the reflected light sources are very bright, the reflection surfaces required to present an image don't have to fully tile the plane. The brighter the reflected light source, the less of the plane needs to be covered, to present images. In addition, directly reflected light sources in a dark environment at night can light displays which have very small mirrors, much smaller than the pixel domain that they color, since a small reflection of a bright light is easily visible in a dark environment. In these cases, multiple different images can be built into the same surface, as several displays can be interleaved. Each mirror tile can, that is, have several independently angled "sub-pixel" displays. These multiple images can all be directed to different viewing positions, or can be directed to the same viewing position sequentially, for two examples.

There are many ways to fabricate the mirror arrays used by mirror and refractive tile array systems. Here's a brief outline of some fabrication methods for mirror tile arrays, as would be known to anyone practiced in the relevant arts of and fabrication;

Arrays can be mass-produced, especially when based on standard regular mirror array patterns that can be stamped into reflective foil or other media;

Arrays can be machined, when based on custom angle settings;

Arrays can be constructed of modular components, using a set of differently angled shims, stacked and combined as needed, at various orientations, to produce any angle;

Arrays can be built using any number of different designs of articulating mirror tiles, which could then be set to any designated angle by hand, by automated device or even to a random setting;

It is typically not important to the underlying invention which method is used, though some proprietary manufacturing methods can be developed. What is key is that the system can be built by any number of methods.

BRIEF DESCRIPTION OF DRAWINGS

FIG. 5 shows a method of screw adjusting the mirror angles in a static array.

FIG. 7 shows a single array with 4 sub-images, each directed to a single viewing location.

FIG. 8 shows one pixel of a sub-pixel bundle with 4 sub-pixels, in 2 alternate reflection scenarios.

FIG. 12 is a detail showing how an image is displayed in reflection only when the source color area projected gradient is turned on.

FIG. 13 shows a section of a display colored by a viewer tracking source color projection system.

FIG. 14 shows a building with angled windows to reflect colors from its surrounding environment.

FIG. 18 shows the top view of prism tile array examples.

FIG. 21 shows a single 3×5 mirror array, as seen from 3 successive lateral viewing positions.

FIG. 22 shows the color source pattern for each pixel in the FIG. 21 image.

FIG. 24 shows a viewer invoking animation by moving his arm through contiguous color source areas.

FIG. 27 shows a display which presents interactive virtual buttons to a viewer.

DETAILED DESCRIPTION AND OPERATION

Figure 1:
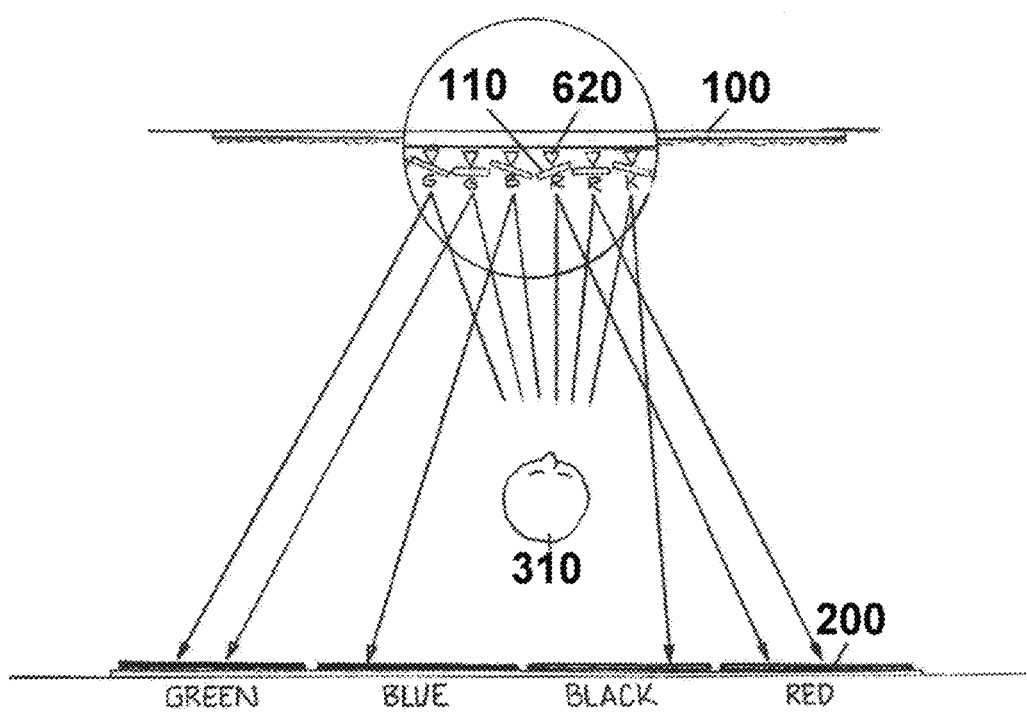
FIG. 1 shows a simple four color reflectively constructed image.

FIG. 1 illustrates a four color reflectively constructed image. In this reflective array 100 with a plurality of reflective elements 110, each element reflects one of four available reflectable reference colors 200. In the circular enlarged section is shown details of six of the mirror tile array's mirror tiles, also called reflective elements 110; the first two reflecting green, the next one reflecting blue, and so on as apparent to a viewer in the position as shown 310. The angle setting mechanism 620 allows any reflective element to show any of the four available colors, as a function of the adjustable angle setting.

When the source colors are primaries or mixable colors in general, adjacent mirrors can be treated as sub pixels in a larger picture color element, analogously to how a common computer display consists of pixels with red, green, and blue sub-components, where those components are mixed to varying respective brightnesses to produce a full gamut of colors. This depicted mirror array display, a bold color graphic of solid blues, reds, blacks, etc. is constructed, by angling its component mirror pixels towards those respective source colors. Alternatively, by grouping these mirrors to mix colors in mirror groupings, a wider gamut of presentation colors could be represented, though lighter and darker shades would not be possible, due to the lack of a white and black reflection sources. Mirror-tile based sub-pixel color mixing can be free-form and arbitrarily complex, as distinct from the rigid RGB, 3-component color grid of a typical computer display. If the mirrors were small enough in a display such as depicted, the color mixing could be very subtle and support very high color fidelity.

Figure 2:
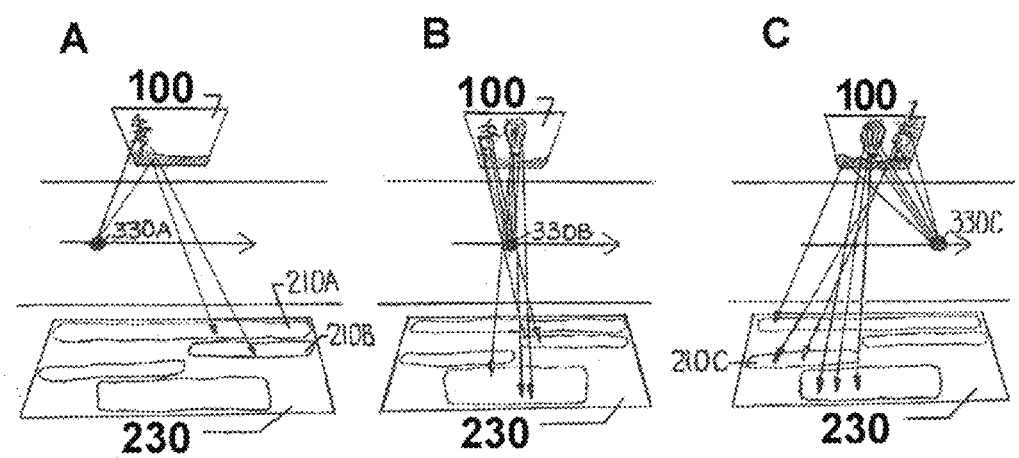
FIG. 2 is an analysis of a display with multiple progressively displayed image elements.

FIG. 2 shows a progressively revealed image to a viewer at 3 viewing positions 330A 330B 330C. The moving viewer sees 3 progressively different images in the changing-image mirror tile reflective array 100. At viewing position 330A only the grass and the pine tree are visible in the display. Note that in source colors 230, the color patches that reflect to show as grass in the image, stretches fully across 230, as shown in 210A. The grass will therefore be visible from throughout the entire overall viewing path (at points 330A, 330B and 330C). The source colors 210B, those that make up the pine tree, only stretch half way across color source 230. Thus to a viewer passing through the viewing area, the pine tree will only be visible from viewing position 330A, ending around 330B. A viewer at position 330C will no longer see the pine tree, but will see a new picture elements constructed of reference color elements 210C, a cloud front.

To summarize, a viewer along this 330 viewer path first sees just a pine tree in the mirror array, then sees a pine tree and a balloon, then the tree disappears from the left of the image and a cloud bank becomes visible on the right. Along the whole viewing path the grass is visible.

Figure 3:
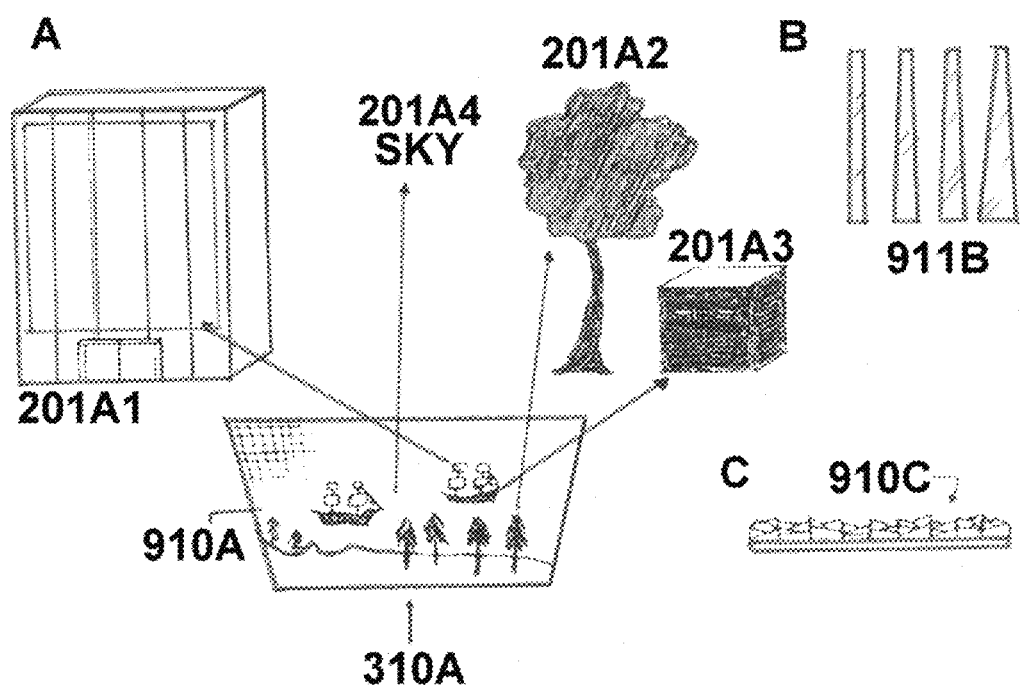
FIG. 3 shows a simple example of refractive elements being used in place of reflective elements.

FIG. 3 shows a refractive array display 910A; a window filled with small, square and slightly refractive tiles, their backs slightly angled from their fronts, in a series of accurate graduation steps of increasing refraction. The tiles are all clear and uncolored, potentially made using high index glass to accentuate the refractive power, to make it possible to redirect a wider field of color sources. By redirecting exterior color reference sources 201A1 201A2 201A3 201A4, they construct an image as apparent to viewers 310A from within the window's room. This refractive array uses four colors; green derived from a tree, grey derived from a concrete building, brown derived from a brick building, and blue derived from the sky, to construct an image of a harbor of blue water green trees and brown hulled ships with grey sails.

Shown in 911B are cross sections of the square refractive tiles showing tiles, with different degrees of refractivity. The refractivity of a refractive array tile is analogous to the mirror angle in a reflective array. A given angle is required to bring a given color to a given tile location, and on that basis a tile of the necessary refractivity and direction of refractivity is chosen. Shown in 910C is an oblique view of a refractive array, the various clear glass tiles visible from the side, showing their various angles and orientations.

Figure 4:
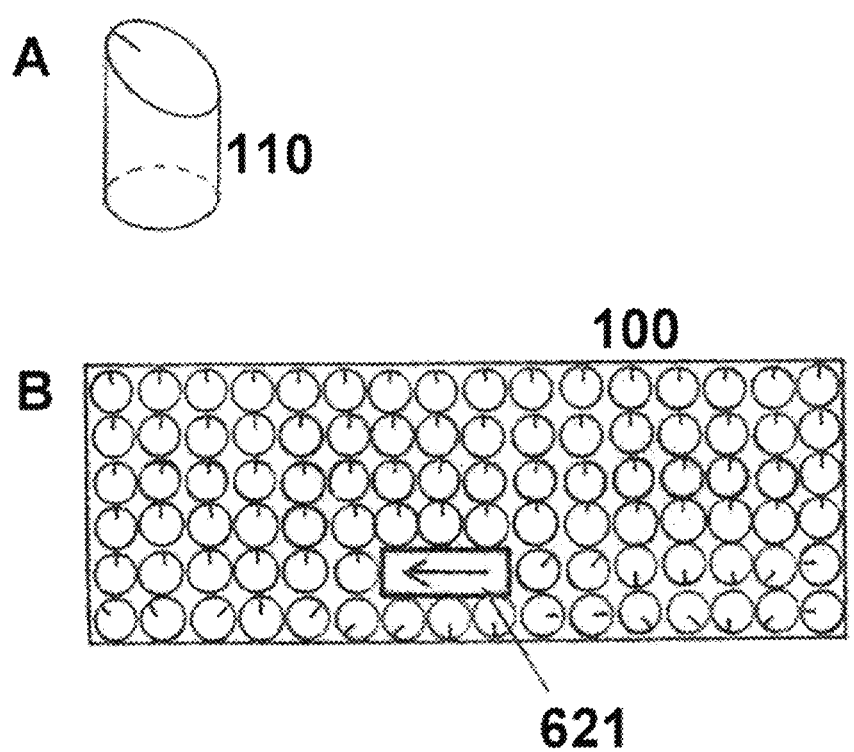
FIG. 4 illustrates a simple angle setting machine that crawls along a mirror array.

FIG. 4 illustrates a simple angle-setting machine that crawls along a mirror array 100; an array crawling display updater. "A" shows a single mirror tile reflective element 110 built from an angle-cut rod, with a polished flat mirror surface at the top. The notch shown on the reflective surface is not inherent to the mirror tile design, but to the illustration, as an indicator in front view of the rotation of each given mirror tile, and thus the direction from which it reflects colors arrayed around the display, and thus the apparent color it presents. In an array built of rotatable angle mirror elements, the palette is typically arrayed in an arc around the perimeter of the array, sometimes in the very frame of the array. "B" shows a reflective array 100 of mirror tiles as shown in "A", their default rotation, as shown in the first few rows, pointing their reflective surfaces down, reflecting whatever color might be referenced there. A simple device, 621, that crawls over the array and resets each mirror tile's rotation, thus updates each tile's color reference and thus, gradually, updates the entire display image.

FIG. 5 shows a method of screw adjusting the mirror angles in a static array, using screw-elevated triangular tiles. A triangularly shaped reflective element 110A can efficiently be angle adjusted by a mechanism at each of its 3 corners. In this design a fine-thread screw angle enabler 622 is accommodated by a threaded sleeve at the rear of each angle tile 110B, said screw 903 embedded but freely turnable and slightly pivotable in a back mounting plate 600 to which all triangular mirror tiles 110B are attached. The elevation adjustments thus made possible for each mirror tile allow each tile to be aimed a certain number of degrees in any direction. Though an array of thousands of tiles could be screw-adjusted by hand, a computer controlled custom designed tool would be the desired method to adjust a large display. A display could be mounted so that these rear-accessible screws were accessible by such a tool, perhaps operated by robot arm, for example, to machine adjust each tile automatically at relatively high speed, under computer direction of the necessary screw set position, to establish the correct angle for each mirror tile. The mirrored front of such triangular tiles would typically not be as far apart from each other as shown in 110A. Just a small separation between tiles would be necessary, to accommodate the slight angle actuations.

Sub-Pixel Bundles

In this specialty application of the basic mirror array image presentation technology described above, each "pixel", or what would normally be a single pixel, or reflector, consists instead of a bundle of much smaller reflectors. Typically, in this arrangement, only one of these elements in the bundle is reflecting to the viewer at any given time. Either there are several different viewing positions, each with a dedicated reflector, among each bundle, or there is a single viewing position and a series of different reflection sources, each with a dedicated reflector among each bundle. The multiple reflection sources, directed to a single viewing position, can be "actively lit" (lit by an active and controllable light source), to effect a series of different images to the stationary viewer, or different combinations of reflection patterns.

There is a wide range of effects possible using independently angled "sub-pixels", to reflect a different color/light source to a single position, or to direct a single light source to a different position, in the two primary cases. Typically only one sub-pixel per bundle reflects to a given viewing position or color source position, but additional effects are possible by lighting or activating different combinations of the sub-pixel bundle elements.

This arrangement creates multiple opportunities for animated imagery. In an alternate embodiment, instead of directing the multiple images to different viewing positions, multiple images can be directed to a static viewing position, if there is a moving reflection source. For example, a fixed array and stationary viewing position can have color source illuminators advancing in a sequence of positions (moving/ adjusted source colors), as shown for example in the sequentially lit light sources B1 through B4, in FIG. 7, or the moving light source 240 in FIG. 8B. A car's headlights on a road, which can sequentially direct different images to a static viewing position, for example, near the road. Or, a bank of sequentially lit light bulbs can give the same result as a single moving light source. Since a train or streetcar headlight has a very precise and consistent position, and movement path, it can be a good light source for this type of display.

In one of the simplest versions of this embodiment, each of these bundles takes the place of what normally would be a single reflector. The 1st sub-pixel in each bundle presents a complete image to a "1st viewing position" in a series, or from a 1st lighting source in a series. The 2nd sub-pixel in each bundle presents a different image, perhaps (but not necessarily) a modification on the first image, to a "2nd viewing position", or from a 2nd lighting source, to establish a thematic presentation or an animation. The different viewing positions of the sequentially targeted sub-pixels in each bundle do not need to be along a path, directed at a single moving viewer. These different viewing positions can be completely unrelated, addressing separate and disparate viewing positions in a space, due to the needs of a given viewing environment, which may have a wide dispersion of display viewing audiences. Or the arrangement of the viewing positions of the component images can be freeform for any desired reason.

Figure 6:
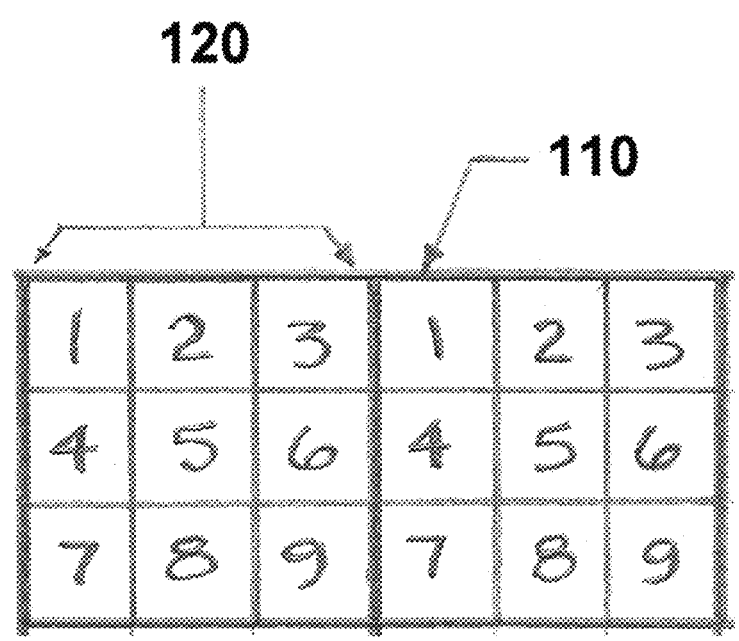
FIG. 6 is a close-up view of 2 mirror pixels, each consisting of a bundle of 9 sub-pixels.

FIG. 6 illustrates a bundle arrangement 120 with 9 pixels/ reflectors per bundle 110. This display, as diagrammed showing a close-up of 2 pixels out of thousands in the full display, will present 9 separate images, each image typically either directed to 1 of 9 separate viewing positions, or each image directed to the same viewing position, but reflecting 9 progressively lit separate light source positions. Each group of like-numbered sub-pixels forms an independent sub-image display. The sub-pixels labeled "1" in each bundle labeled present, as a group, a single image. Sub-pixels labeled "2" are a 2nd image, etc. The number of images each pixel array is capable of contributing to is typically equal to its number of sub-pixels. Typically, but not necessarily, all pixels in an array have the same number of sub-pixels. This array can display 9 different images to the same position, depending upon the varying light provided to the 9 differently angled sub-images. Or it can display 9 different images to different positions simultaneously, each image relying on the same light source. Other viewing position and light source options are possible, but these are two general methods.

Displays of this type typically would need to be lit by bright light sources, since the sub-pixels of each sub-image tile only a small portion of the plane, and therefore reflect much less light back to the viewer (compared to a typical ambient-lit display, which tiles the plane, or nearly so, and therefore reflects ambient light source at nearly ambient brightness).

When reflector bundles are set to present a sequence of images, viewing positions could be placed at progressive positions along a viewer's path of travel, so that a sequence of images is presented in rapid succession, as the viewer moves. In arrays with large bundles of sub-pixels, there is the potential for many separate images, able to present long animated sequences, or different images to a large number of unrelated viewing positions.

FIG. 7 shows a single array 100 with 4 sub-images, each directed to a single viewing location, 310. Light sources 241, B1 through B4, are individually associated to sub-pixels 1 through 4. They can be lit one at a time, to display sub-images one at a time to viewer 310. They could, for one of many alternative arrangements, be lit at the same time, displaying separate images to 4 separate viewing positions.

FIG. 8A shows one pixel 110 of a four sub-pixel bundle array 120, where each of the four sub-images are generated from a single point light source 241, presenting the 4 images to 4 points along the path of a moving viewer 330 shows one pixel 110 of a four sub-pixel bundle array, where each of the four sub-images are generated by 4 separate light sources, or in FIG. 8B by a single light source moving along a designated path 240, to project 4 different images in succession, to a stationary viewer 310.

Another possible viewing position arrangement for the sub-pixels in the display matrix is a viewing position matrix, where the viewing positions are not along a path, but are in an x/y grid. In this display and viewing arrangement, a 2-dimensional animation can be displayed. The display when viewed from x/y positions in the viewing field can display images or information that is significant in some way relevant to x/y changes in the position of the viewer. For example, the bundles could consist of 100 sub-pixels, and the viewing positions could be arranged in a 10×10 grid. Movement laterally, by the viewer, through these 10 lateral viewing positions could present, for example, 10 progressive lateral perspective views of an object. Movement vertically (or towards/away from the array), by the viewer, through the 10 vertical viewing positions could present 10 progressive vertical perspective views of the object. The viewer could move freely left/right, forward/back through this 10×10 position viewing area, to see different dimension of the 10×10 image display.

Figure 9:
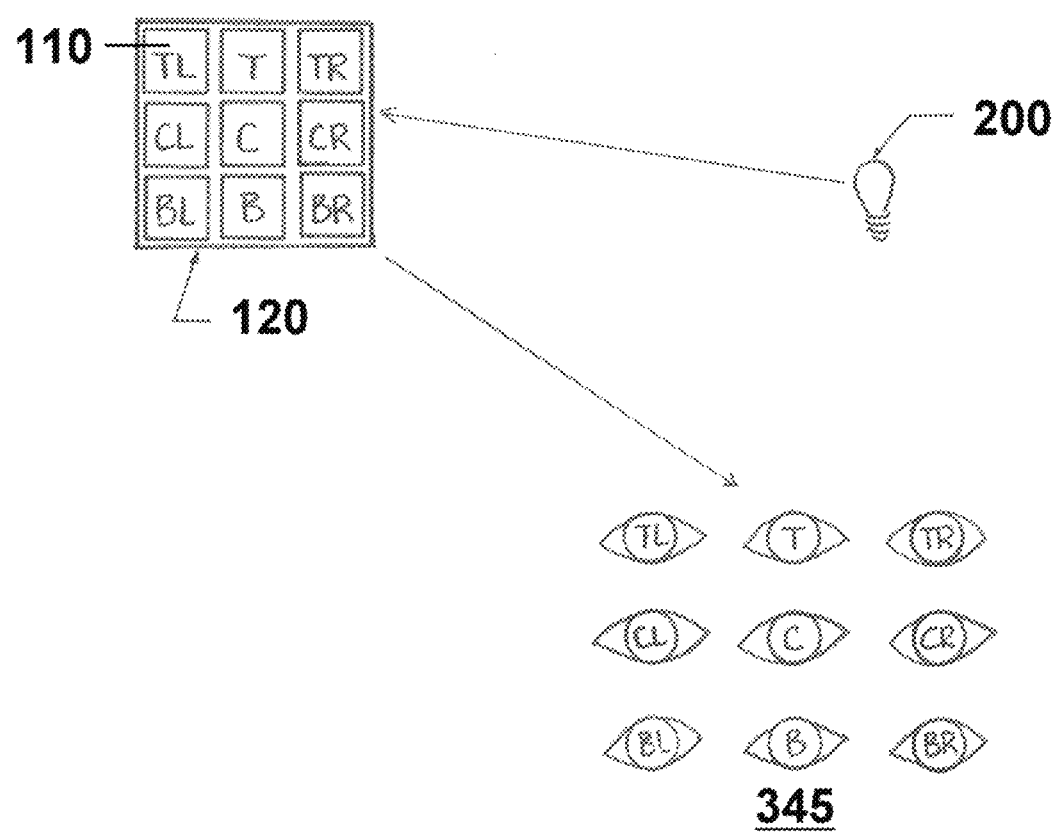
FIG. 9 shows one pixel of a 9 sub-pixel bundle array, where each of the nine sub-images are generated from a single point light source.

FIG. 9 shows one pixel 110 of a 9 sub-pixel bundle array 120, where each of the nine sub-images are generated from a single point light source 200. These sub-pixels are oriented to present their 9 separate sub-images not along a path (as in FIG. 8B), but to different viewing positions in a two dimensional matrix 345. Sub-pixels "TL" (top left) contribute to construct the sub-image as seen from viewing position "TL". Sub-pixels "C" (center) contribute to construct the sub-image as seen from viewing position "C". The other sub-pixel/sub-image correlation designations are "T"=top, "TR"=top right, "CL"=center left, "CR"=center right, "BL"=bottom left, "B"=bottom, "BR"=bottom right. A viewer viewing image "C", could shift position left or right to see images "CL" or "CR", or could shift position up or down to see images "T" or "B".

A sub-pixel bundle can be just a few reflectors—a 2×2 sub-array bundle (4 reflectors)—or a sub-pixel bundle could consist of 50×50 reflectors or even more. With more, and therefore smaller or more widely separated reflectors, the source light would generally need to be brighter. A full display would, again, consist of thousands of these bundles, instead of thousands of single-surface reflectors. These bundles could be made by literally "bundling" together individual pin-sized rods, with angled and polished ends, each at proper rotation and with the properly angled end to produce the individual sub-pixel angles required. Many other methods to fabricate the sub-pixel angles could be used to achieve the effect described above, by establishing the sub-pixel surface geometry as described.

The angle-cut pins or thin rods, in a given sub-pixel bundle, do not need to be in a specific position in a given sub-pixel bundle. Only the unique specified reflective angle of the given sub-pixel need be preserved, so that from some sub-pixel position within that pixel bundle, the designated light source is reflected towards to viewer: each sub-image typically has one sub-pixel in each bundle. However, if a given sub-pixel in a given sub-image is in a black part of the presentation image, and therefore has no reflective purpose, then there is no need for that sub-pixel to be present. In some fabrication methods, where it is feasible to selectively dis-include un-needed subpixels, then it will not be present in the array.

In a re-configurable sub-pixel array, it is necessary to always include all subpixels, since while some images will not require a given pixel, others will. One way to update such a display is for there to be a method to specifically reset the angular position of each sub-pixel element.

Active-Lit/Ambient-Lit Hybrid Display

Two basic classes of reflected light or color sources are frequently used by these displays:

a) simple ambient sources, where the light reflected by the display is light reflected by a surface that is lit by some combination of the local ambient light and one or more original illumination sources, and;

b) original illumination sources, reflected directly by the display.

Primary illumination sources (b) are typically smaller and brighter than secondary sources (a). These two types of reflectable color sources support different types of displays. Light sources of type (b) are more prevalent at night, and light sources of type (a) during the day, though both can be present both day and night. Secondary, ambient light sources tend to require mirrors that tile the plane, or nearly tile the plane. Primary light sources can be much brighter, and therefore can be used to construct images using mirrors that are smaller than the pixels that they constitute, much smaller than plane-filling mirrors often necessary in displays reliant on ambient light. Bright primary light sources are ideal for the "bundled" sub-pixel based displays, described above.

In another refinement of this display technology, a single display can be built to accommodate both these types of light sources at the same time, using various techniques. One technique is to construct an array with large mirrors, for (a) type sources, for daytime viewing, and include pixel bundles for night time viewing in the same array, in the spaces between the larger ambient display's mirrors. The separate day and night images may be entirely unrelated, with each not visible when the other is visible. Or, the two displays can be part of the same image/effect, sometimes both visible at the same time. For example, the primary light source-lit bundled reflectors can present a series of text images that are lit by a series of controllable light sources. Thus, during the day, the (a) type image can have text message embedded using a (b) type series of images which can be turned on or off to display as desired, to enhance or form part of an overall image/text presentation. Another use of the integrated primary source array is to modulate the passive display with color toning or various other special visual effects.—high-lighting, animated effects, and many other effects using variations of this method of integrating subpixel bundle type displays with large-mirror ambient displays.

Figure 10:
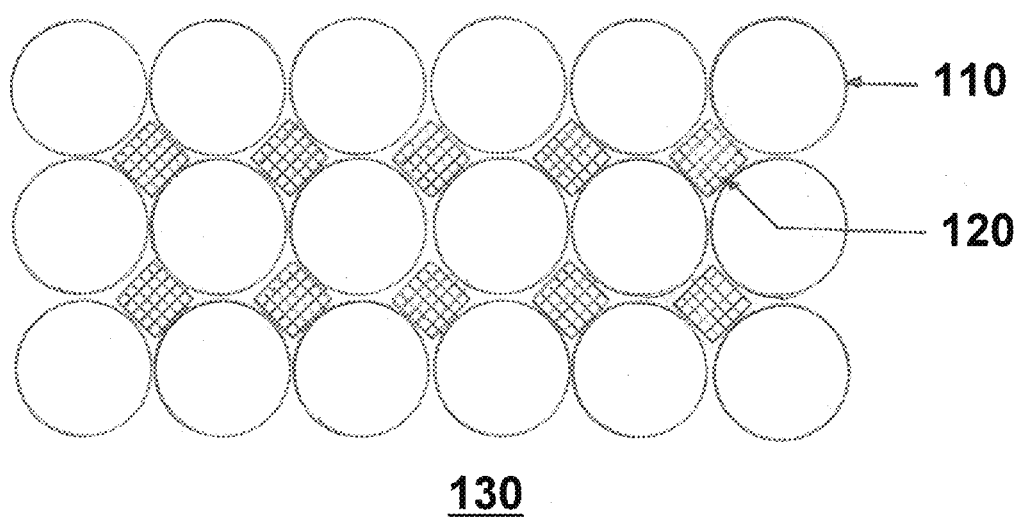
FIG. 10 shows a small section of a hybrid display, large mirror reflectors interspersed with a reflector bundle type display.

FIG. 10 shows a small section of one possible combination 130 of (a) 110 and (b) 120 type reflectors. A grid of nearly plane-tiling mirror circles constitute a standard (a) display, which present image effects constructed from ambient lit color sources (typically the daytime portion of the display). In the spaces between the circles are 5×5 element bundles of tiny bright light source (b) reflectors (typically the nighttime portion of the display). For every large standard reflector there are 25 small bright primary source reflectors.

Dynamic Image Toning

In one embodiment of this display technology, the passive, ambient color sources of a display are a given color, either designed for and placed into the reflected environment, or existing there already, or a combination of the two. Along with passive color sources, it is possible to use "active" primary light sources, such as light fixtures or lighted areas under the control of light fixtures. "Active" refers to the fact that the light source can be actively controlled, rather than being an ambient light source.

Passive, ambient color sources can vary over time, including hourly changes, seasonal changes and split second changes, and these changes can be used as enhancements to the color design of the display image. These changes are "givens"—are a color resource framework within which to work when designing a display. Active color sources, by contrast, afford control over the color tone and imagery content of the image in useful ways that can be specifically designed into the display and light source as an integrated system. One purpose for this type of active control is to counteract the light and color changes in the reflected environment, and uphold some color, tone and brightness consistency to the display, which otherwise might be lacking if, for example, at some points in the day some of the ambient reflectable environment became too dark.

Passive color sources and active color sources can be combined with great flexibility and for many purposes and effects. For example, a simple active light source enhancement to an otherwise completely passively color-sourced display can be a dimmable light that is shone on some of the passive color sources, to modulate their brightness or tone, and thereby modulate the brightness or tone of the portions of the image that derive their color from those sources. Passive color sources can thus be brought under a degree of active control, to add many dimensions of image toning, coloring, modulating, brightening control.

Figure 11:
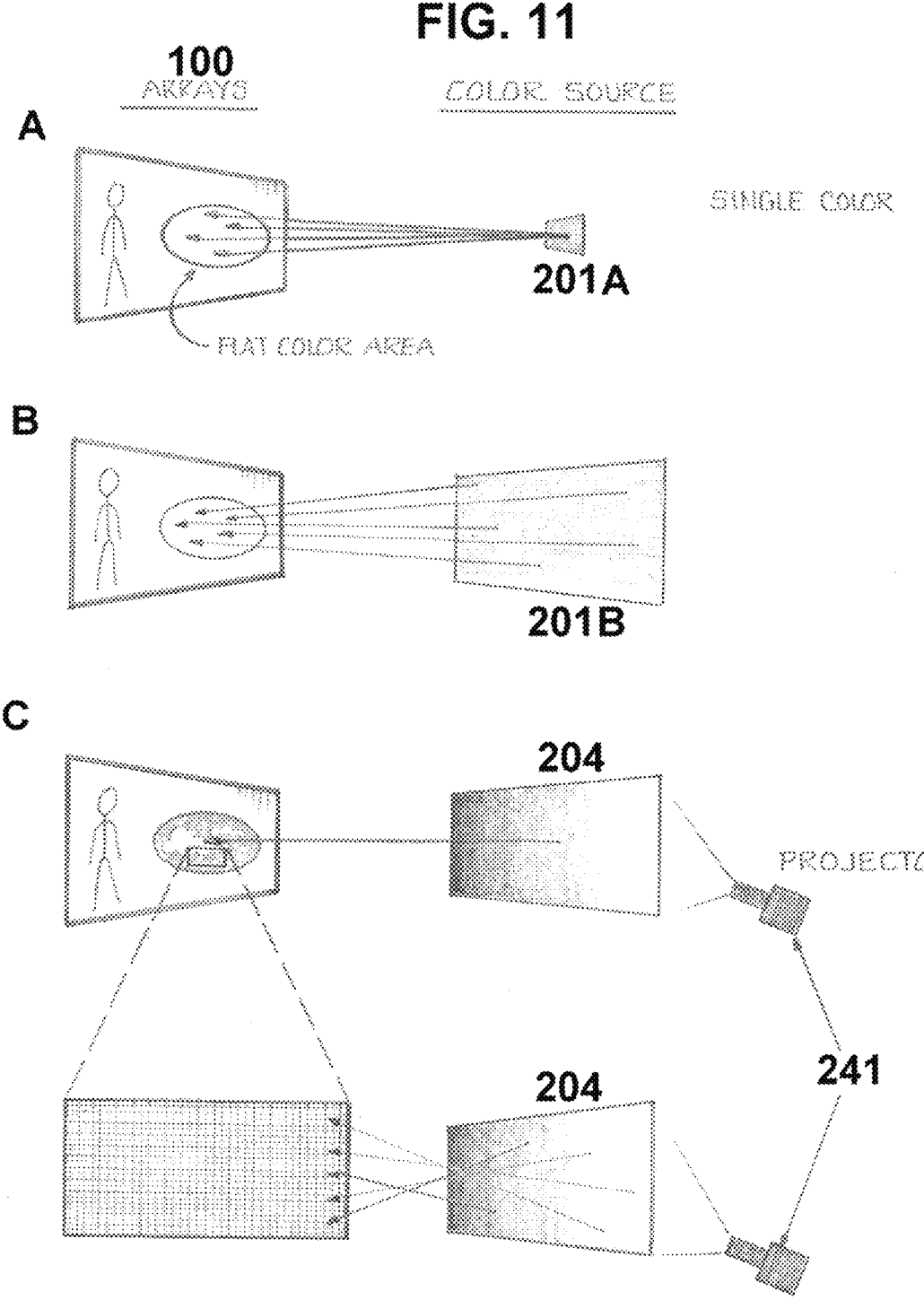
FIG. 11 shows an oval section of an image in which the reflector pixels reflect a color source lit by a controllable light source that optionally projects a color gradient.

In a more involved application of this method of actively controlling the light environment of a mirror array image display, images or sections of images can be selectively displayed or not displayed under light source control. FIG. 11A shows an oval section of an image in which the reflector pixels are in part 1, reflecting a common point in a single color source area 201A. In FIG. 11B, the pixels in that same image section are each individually mapped to their own separate positions in the color source area 201B. The viewed image result 100 is the same, in that the oval section reflects a solid color to the image viewer, as long as that larger area is the same color as the smaller source color area. In FIG. 11C, the source color area is now colored by an active light source 241, to generate a color gradient 204C. A mirror reflecting from the left side of this source color area, where the projected gradient is dark, will be reflect this dark shade to the viewer. Mirrors reflecting from the right side of the gradient, will reflect this light shade to the viewer. An image can thus be constructed by targeting each pixel, in the oval area, in this case a cloud image. This image would only be apparent to the array viewer when the gradient generating light source is turned on.

FIG. 12 is simply a detail of FIG. 11C, showing how an image 100A is displayed in reflection when the source color area projected gradient 204A is turned on, and an image 100B is not displayed when the source color area projected gradient is turned off 204B.

Different groups of mirrors in an array can reflect many different actively lit source color areas, allowing variations of the above described mountain image effect to be combined, using different lighting methods, lighting patterns and mirror reflection source position patterns.

Instead of lighting a source color area with simple on/off solid illumination, or a brightness gradient, a specifically designed pattern can be projected, as a color source. A small grid of the reflectors in the display can be mapped in a pattern where no two reflectors map to the same reflection source area. The lighting of these sections of the color source can be individually controlled. This mapping is known to the lighting control system, so that in software any desired display pattern can be achieved, by lighting the necessary source areas to display the given pattern in the mirrors. This mapping would optionally not be ordered, so that to reflectively display the word "hello", the reflection source would not simply show the same brightness pattern, i.e., "hello". The source pattern displayed would be dappled light, for example, or even not noticeable as a pattern. Since the source color areas don't actually have to be contiguous, and can in fact be quite widely separated, the controllable displayed text or image can be modified by changes in source illumination that is not readily noticeable to the viewer.

FIG. 13 illustrates how this works, using the simple example of a 4 pixel/mirror display or section of a display. FIG. 13A shows the 4 mirror pixels 100A to be colored by light projected onto 241B a wall area FIG. 13B. FIG. 13C shows the sections of that wall area from which each of the 4 pixels is reflecting towards the viewing position 210C. FIG. 13D shows 4 colors projected onto the source color areas for those 4 pixels/mirrors 241D, and shows their resulting colors, 100D, as seen from the viewing position.

FIG. 13E shows that the 4 source color areas 210E can be moved laterally, if the viewer moves laterally. Thus, the coloration of the 4 mirrors will be preserved, as the viewer moves. By tracking the position of the viewer, and registering the position of the viewer's eyes, using a computer vision system, and feeding this information back to the projection system, the projected colors can be moment by moment moved along the wall so that no matter how subtly or quickly the viewer moves, the 4 mirror pixels remain colored by their 4 small projected color source dots.

Based on limited wall space, onto which to project color dots dedicated to color individual pixels/mirrors, it may only be possible to individually color (and therefore dynamically control by computer directed projection pattern) a few pixels in a large display. Text requires only a small number of pixels, so this method can be useful for including a small area of dynamic text in an otherwise more typical type of display, based on reflecting ambient light sources.

By including a viewer tracking system, such actively lit text or small images can be persistently presented to moving viewers, simply by modifying or moving the projected lighting pattern reciprocally along the wall in response to viewer movement. In other words, a reflection pattern that displays the word "hello" to a viewer at a given position, will not display "hello" to the viewer if he moves. But, as noted above and illustrated in FIG. 13E, the projection of the reflection source can be moved as needed along the source color projection surface, as the viewer moves, so that the word "hello" remains displayed in reflection to the viewer.

Other effects possible when colors in a reflected image are projected and under dynamic control include color toning the image (hue, saturation, contrast, brightness, etc.), by changing the tonality of the projected source colors. Not all source colors need to be live projections, to exercise useful control over image dynamics. Just a minority of an image's source colors may be projected, to invoke color toning or to incorporate a small text display into an image or to invoke many of the related image control effects.

Camouflage

This is a very general application, illustrated in FIG. 14A and FIG. 14B with a simple architectural instance. FIG. 14A shows a building the windows of which are angled 100A to reflect colors from its surrounding environment of forest and sky, so that from the point of view of cars on the approaching road 330 the building somewhat blends in with the shape of the hills and sky behind 201. FIG. 14B shows the road's-eye view, with the building's reflectively borrowed colors blended against the background hills and sky 100B.

In a more complete implementation of this embodiment, dynamically actuated mirrors, viewer position tracking and environmental color awareness are integrated:

The surface of a vehicle, building or article of clothing is covered or partly covered in a mirror array, in which all the mirrors are under constant dynamic control by a computer system which tracks and knows:

a. The position of the viewer, for whom to create the camouflage effect;
b. The orientation of every mirror in the mirror array surface;
c. The apparent view (shading, brightness, etc.) from the point of view of the viewer, of the scene behind the object to be camouflaged;
d. The reflectable environment in front of the mirror array, specifically with knowledge of what objects/surfaces in front of the mirror can be reflected to reproduce the color and tonality of the scene behind the object to be camouflaged.

With this knowledge, the computer can, moment by moment, maintain a reflected image, as seen from the perspective of the viewer, which mimics and is roughly indistinguishable from the background behind the object. The object is, essentially, camouflaged by a live effect similar to the use of the image "cloning" tool, in Photoshop, which is often used by photographers to paint out telephone poles and other unwanted visual elements from photographs. The Photoshop cloning tool typically copies background texture and imagery to cover up the "camouflaged" portions of an image, the area to be cloned out. In the case of this system, the background cannot be reflected forward. However, the background is known to the system, and the areas of the environment that can be reflected back to the viewer are also known, and those that match the background can be reflected back to the viewer, pixel by pixel, to approximate the cloning effect.

Templates for Mass Adjustable Display Update

When mirror elements in the form of angle-cut rods are mounted in such a way that they can freely rotate or pivot, or can be loosened to be able to freely rotate or pivot, then a shaped template can be applied to entire sections of an array, to guide all the mirrors into a new orientation, thus "setting an image". For example, if the angle-cut pegs made from rods as described above are mounted in a perforated card where the holes for each peg are just slightly larger than the peg, then the pegs can freely rotate. If each of these pegs were of identical length, then a half circle perforation, at slightly smaller diameter than the pegs, could be pressed to the angled end of each peg, and vibrated, to seat the peg angle end into the half circle, thus setting the rotation of the peg to match the rotation of the half circle. Given an array of 500×300 pegs, a card with 500×300 half circles could be vibrationally mated for a few moments to set all 500×300 peg orientations, thus updating the image shown by that array. A locking mechanism, perhaps effected by tightly pressing the back of the array to a board-like backing, could be used to lock the pegs in their new position, until they were to be updated again, using a different half-circle-perforated card. These cards can be readily cut by laser. The template to cut, for each new image, is simply a matter of converting the color of each mirror/peg to the reflection angle corresponding to its display color. This angle is established by how colors on a radial reflection gradient or color map is laid out around the display.

To translate an image to such a template card, swatches of the colors of the pixels in the image are arrayed radially around the display, at the positions that would be reflected by the angle of the mirrored rod ends, towards the viewing position in front of the display. Once the angle position of each color swatch is known, it is known that any pixel that needs to display that color needs to be rotated to that angle. The exact angle varies depending on the x/y location in the array of a given rod, to reflect its target color swatch to the viewer. The template card half-circle for that rod is thus cut at that angle. This can be done laboriously by hand, of course, though in practice it would be done under control of software that follows that is provided the image and color environment information, and automates the steps as described, to design a vector pattern to cut a template card as needed.

Figure 15:
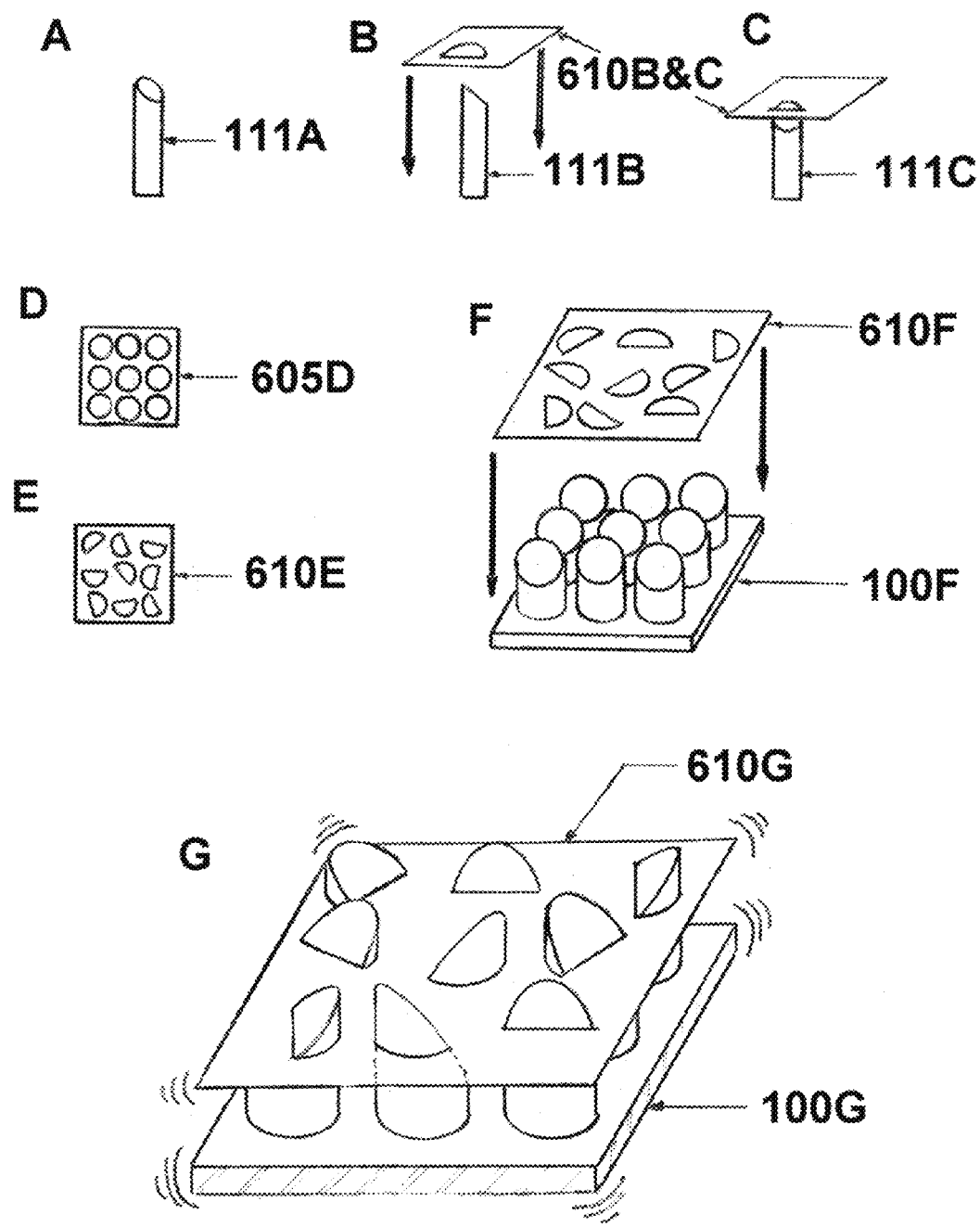
FIG. 15 shows how angled rods can by set to specified rotational position using a template.

FIG. 15 describes a system to set all rods in such an array quickly, by using a template of half circles, which is vibrationally mated to the angle-cut tips of the rods, causing each to rotate to the orientation of the mated half circle. FIG. 15A shows a single angled rod 111A, oriented in a random rotational position. FIGS. 15B&C show a rod rotational positioning card 610B&C, which is simply a rigid card with a hemisphere cut into it. This card when lowered onto the rod 111B, as both are vibrated, when the rod is mounted loosely so at to be able to freely rotate, will force the rod to rotate to the orientation of the cut hemisphere. FIG. 15C shows the angled rod after having been vibrationally orientated by the cut card template 111C. FIG. 15D shows a 3×3 grid of rod holder peg holes 605D, the diameter of which is slightly greater than the diameter of the rods they will hold, to allow the rods to rotate when vibrated. FIG. 15E shows a positioning card 610E for a 3×3 grid of rods. FIG. 15F shows the placement of a positioning card 610F over an array 100F of 9 rods, their rotational position not yet set. FIG. 15G shows the 9 rods 100G of FIG. 15F, being vibrated into their desired rotational position guided by the card 610G.

Figure 16:
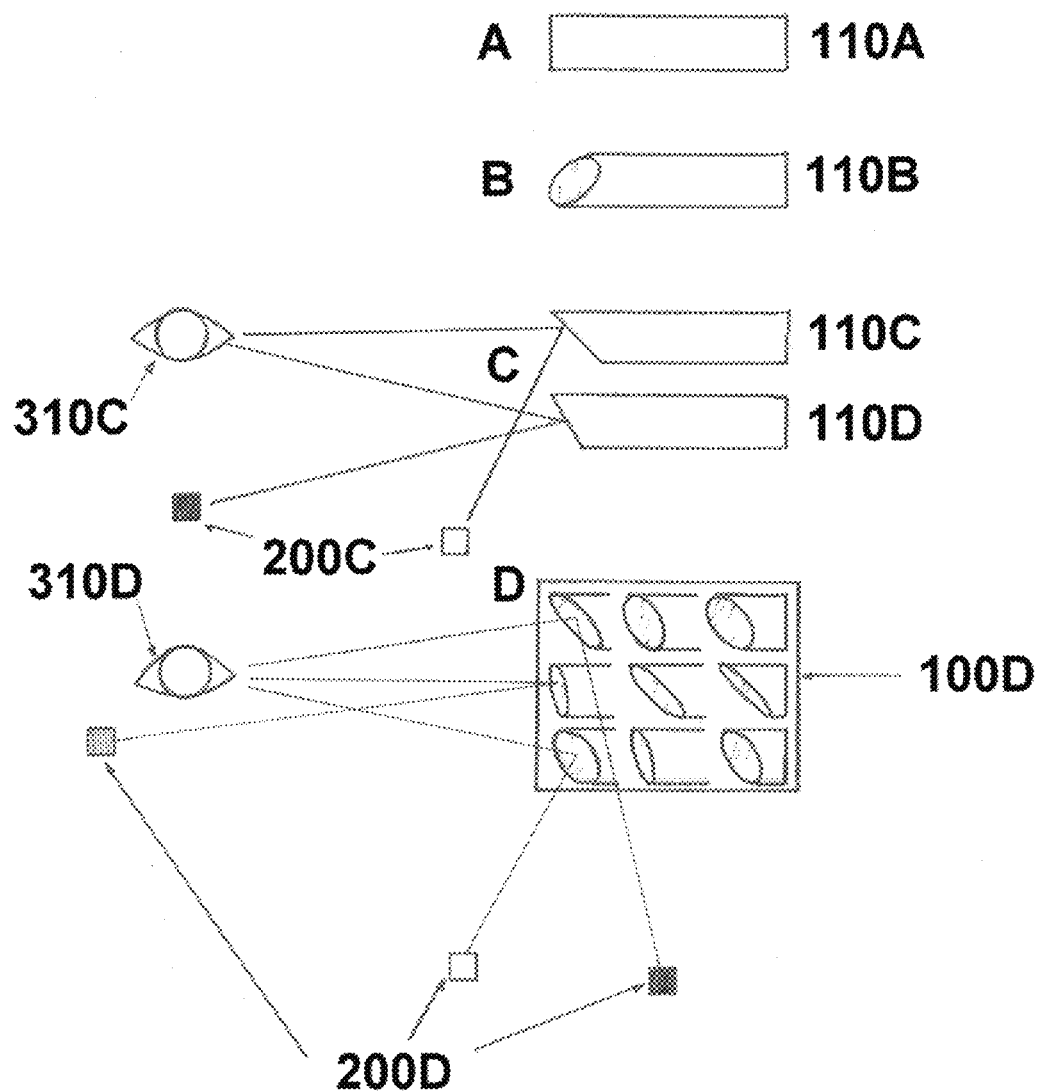
FIG. 16 shows a progression in the construction of an angle cut rod reflective array.

Certain types of angle-cut rod reflective arrays obtain their reflection colors based on the rotational orientation of the rod plus variations in the angle of the cuts of the rods, to reflect colors throughout the reflectable environment, rather than just from colors in radial stripes around the array. FIG. 16 illustrates the basic function of this type of display. These types of displays can also be vibrationally set by templates, within certain limits of the variation of the angles of the component mirror pegs, and certain limits of the variation of the heights of the pegs.

FIG. 16A through 16D show a progression in the construction of an angle cut rod reflective array 100D. A single uncut rod 110A, the end of which was then cut at an angle 110B to establish it as a specific color reflecting element (depending upon where in the given environment, the required pixel color is angularly located). Next is shown how two differently angled reflectors 110C&D will reflect different mirror pixel colors to a viewer 310C. Next is shown a simple 9-mirror pixel array 100D the first row of three angle reflectors are reflecting of which are reflecting 3 differently shaded color sources 200 to a viewer 310D.

Hybrid: Mirrored/Refractive

This embodiment illustrates a sampling of possible arrays composed of wedge-shaped lenses (prisms) on top of a flat mirrored surface, or a flat (un-mirrored) surface where each prism is bottom mirrored. Also shown are prism shapes on a clear substrate, with one or the other side of the substrate then mirrored. Further methods to combine angled reflective surfaces and refractive elements are possible.

Figure 17:
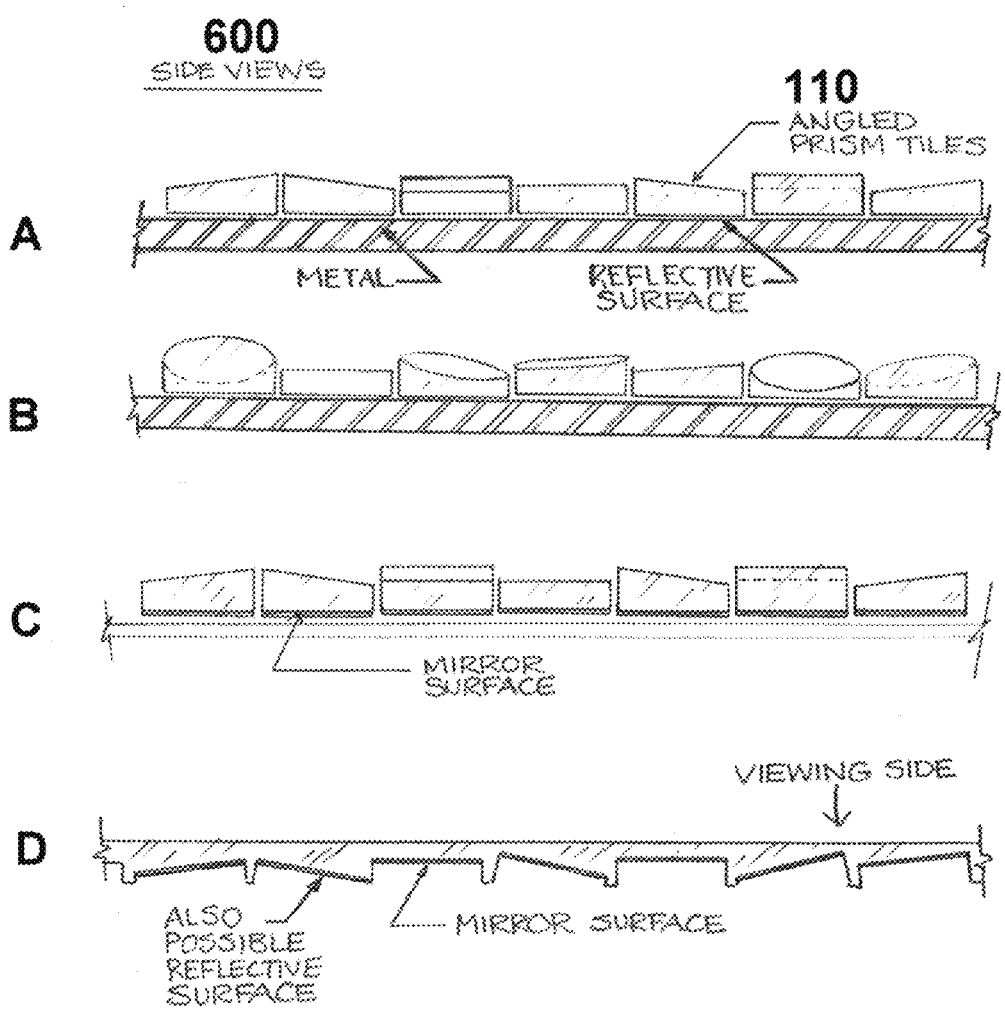
FIG. 17 shows various versions of prism tile arrays combined with reflective surfaces.

FIG. 17A shows rectangular prism tiles 110 arrayed on a reflective metal surface. FIG. 17B shows cylindrical prism tiles on a reflective metal surface. FIG. 17C shows rectangular prism tiles with a mirrored surface on the bottom side of each refractive tile. FIG. 17D shows angles milled into the underside of sheet transparent matrix with reflective surfacing applied to the milled surface.

Construction methods 600 of mirror/refractive hybrids include:

1) In FIGS. 17A&17B various angle-degree clear prisms are placed on a mirrored metal surface. Variations could be, for example, 0.5 degree to 2 degree angle wedges, in 0.1 degree increments.

2) In FIG. 17C, the mirroring is on each refractive tile, so that the prisms don't need to be placed on a mirrored surface.

An array of these types (1 and 2, above) could be constructed from a building block set of prisms of varying angles, just as building a standard color tile mosaic is constructed—tile by tile based on color. With respect to prism placement, angle of refraction and orientation of prism are the determinants of color. Each color in the environment is known by its angular position in relation to the array, and can be reflected back to the viewer by the placement of one of the available prisms.

3) Alternatively, in FIG. 17D, the angles are machined into a plate of glass, or clear plastic or other material, thereby introducing various prisms, and the resulting angled surface is subsequently polished. When viewed through the flat surface, each tile's reflected light angle is affected by both the mirror surface angle and the refraction. The color sources would be constellated in the viewing space accordingly. Another image could be viewed from the machined side of this glass pane, in this case the reflection angles being established just by the mirror angles.

In a further refinement of this system, the machined surface could be filled with clear material, or mated with the negatively matching machined shape, so that the final glass plate is flat on both viewing sides, with a complex angled mirrored array sandwiched in the middle.

FIG. 18 shows three configurations of prism tile array segments 100. If these prism tiles are square then each angle size provides 4 reflection options, depending on placement orientation (4 compass positions). If the prisms are round, then they can be placed at any rotational orientation, giving greater (i.e., unlimited) reflection direction freedom. With round prisms a single wedge angle, at differing angle settings, is sufficient to present a full color image (reflecting a radial full-spectrum color gradient). One drawback of using round prisms is that they don't tile the plane. The gaps between adjacent tiles can optionally be filled, with smaller round or other shaped elements, to improve the resulting image quality.

FIG. 18C, shows a rectangular grid used for circular reflectors, which leaves more of the plane un-tiled, compared to when a hex grid is used. In this case the space between tiles is mostly filled with smaller circular reflectors.

FIG. 18A shows a top view of square prism tiles providing four reflection orientation options 110. FIG. 18B shows top view of a rectangular grid used for circular reflectors providing unlimited rotational orientation, but with unused tiling space 111. FIG. 18C shows a rectangular grid used for circular reflectors with fill-in round reflectors to more efficiently tile the plane 130.

Light Modulation

Light bulbs waste energy by casting illumination onto walls and other areas which, for some purposes, don't need light. In some cases, the light cast on a wall provides useful secondary lighting. That redirected light radiates in all directions, typically, much of it wasted. An angled mirror array can precisely direct secondary light from a fixture with precision, providing customization difficult or impossible with other methods. This, in general, is a common technique. Several specialty arrangements may be novel, such as the one described below.

Figure 19:
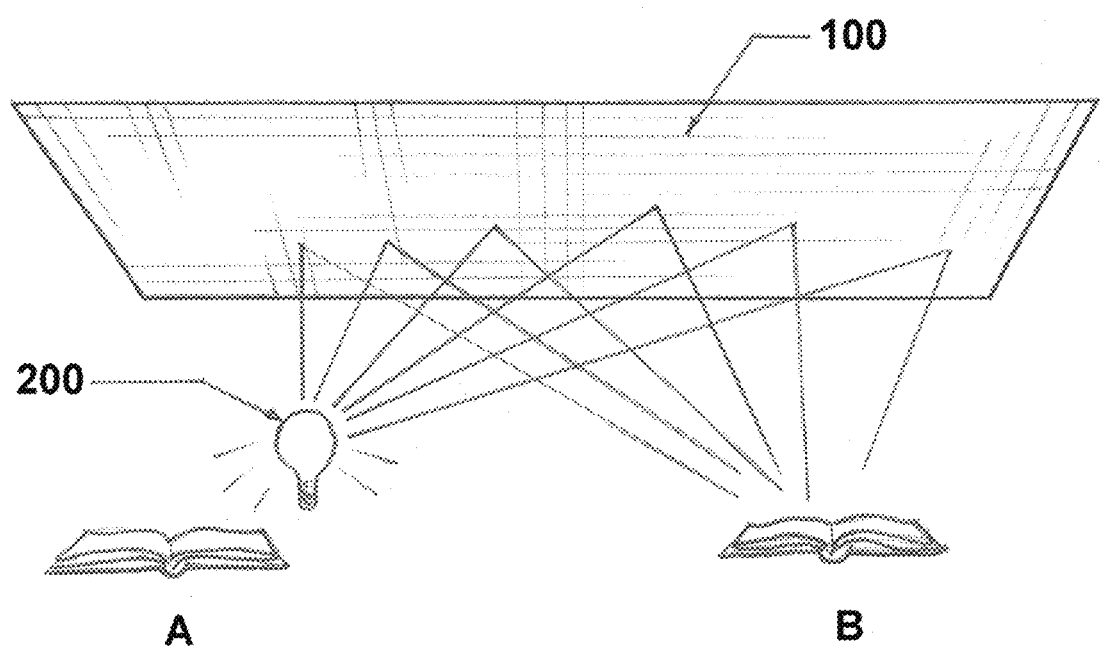
FIG. 19 A shows an array concentrating reflected light from a point light source, onto a book.

As shown in FIG. 19, a single candle or small light source by which one could normally barely read, in close proximity, could provide reading light for two or more specific positions in a room. The book in FIG. 19B, which is not close to the light source 200 in this example, is more brightly lit than the book near the light source FIG. 19A. This is just an illustrative example. A more likely usage is the optimization of standard light fixture output and directionality—precise directionality control to a) greatly reduce the required wattage for given uses and b) allow new useful and interesting modalities of control over room lighting distribution. If light reflection arrays 100 are designed and fabricated for specific lighting situations (one-offs) much better efficiency (and aesthetics) can be achieved, compared to the standard one-size-fits-all reflector usage.

To set up such arrays, the book, in this case (AKA the light focal point) is considered the "viewer", the light source is the single "color source", and the array is set up according to methods already described. In a variation, there can be multiple light sources, and multiple light focal points (multiple "books", per the diagram). As a default, the mirrors closest to the given light source are all reflecting its light towards the light focus.

However, artistic and design choices can be overlain on the choice of which mirror reflects from which light source to which light focal point, and thus image patterns can be displayed in the selection of which mirrors direct between different sources and targets. In addition, the size and shape of the mirror facets can be varied for further artistic effect.

These functional arrays can thus has an important secondary role, as attractive wall and ceiling covering design elements.

Directionally Intelligent Color and Text Effects

Two of the applications of this technique are:

Color change effect. Architectural wall or wall section accent color, which changes as a function of viewer position.

Text change effect. Signs, the text content of which is different as displayed to various different viewing positions.

Color Change Effect

Figure 20:
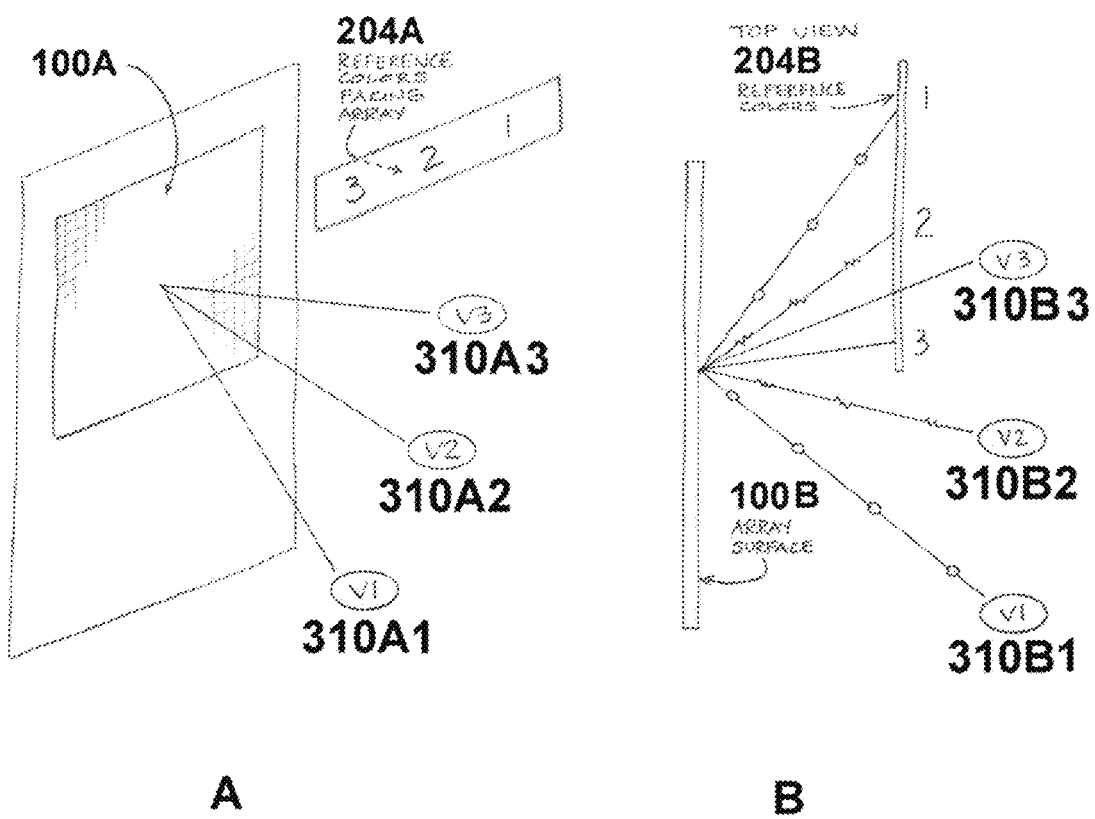
FIG. 20 diagrams how a color source gradient in reflection can simultaneously display different colors to different viewing positions.

In an auditorium, for example, a section of the wall around the entire room, high near the ceiling, changes color as a function of from where it is viewed in the auditorium. From one seating section it is red, from an adjacent seating section it is orange, then yellow, etc. As shown in FIG. 20, from v1 310A1, viewing area 1, all tiles on the array 100A reflect color 1, on a color reference source in a hidden panel hanging from the ceiling. Viewing area 2 310A2 sees color 2, etc.

FIG. 20 diagrams how a color source gradient of colors 1, 2 and 3 204A&B, facing a mirror array 100A&B will reflect different colors along a continuum of viewing positions V1 310A&B1, V2 310A&B2 and V3 310A&B3, respectively. 100A & 100B are a mirror displays, in this example mounted high on a wall. Reflection sources A 204A and B 204B are cards hanging a bit higher, and in front of the mirror displays, facing the array. Viewers at position V1 will see the entire array colored by color #1. Viewers at position V2 will see the entire array colored by color #2. Likewise for viewers at position V2, and color #3, and all viewing positions and colors from 1 through 3.

This effect is achieved by angling every mirror between a common viewing position V and a common color source position. When all mirror angles are thus synchronized, lateral movement of the viewing position will result in their common color source position to move laterally in the opposite direction along the color source surface. Depending upon the specific geometry and distances of each element in this construction, the color source positions of all the mirrors will remain close enough together as they move, so that they all remain focused on the color source. Depending again on the given geometry, the linear orientation of the color source gradient will be flat, or angled up or down, to best track the movement of the color source focus as determined by the viewer source focus.

Text Change Effect

Directionally intelligent text signs can be implemented in a similar way. Each pixel/mirror in a text sign, to give 5 different texts from 5 different positions, has a pattern of 2^5 different possible sequences of on/off or black/white states, as the sign progresses through the 5 different text states. Each pixel may be white, white, black, white, black, as the sign progresses through its 5 states, which happens as the viewer progresses through the 5 viewing positions. Any pixel that exhibits this color change pattern will reflect a color source with that color pattern. There are 31 other color sources, for the other 31 possible color changes patterns. All pixels will reflect one of those color sources, as necessary to display a sign with the desired text changes, through the 5 viewing areas to which those 5 text signs are to be displayed.

Here is an example of a sign with 3 different text displays. FIG. 21 shows a 3×5 mirror array, as seen from 3 successive lateral viewing positions 100A 100B 100C. The color sources for these 3 successive viewing positions are therefore, likewise laterally adjacent, as shown in examples 200A and 200B. The top left pixel in this display is dark, from all three viewing positions. Therefore, the color source for the top left pixel is also dark from all 3 viewing positions, as shown in 200A. The top right pixel in the first image 100A is white, but is then black from viewing positions 2 100B and 3 100C. The color source for this pixel, therefore, is white from viewing position one, and black for the next two positions, as shown in 200B. Each of the pixels in these images will color from one viewing position to the next, in a pattern as shown in FIG. 22. "BBB" in this figure indicates the color pattern as shown in FIG. 21 200A. Likewise, "BWW" indicates and color source pattern of black, white, white, and so on for the other letter patterns.

FIG. 22A shows the color source pattern for each mirror in the 3×5 array of the FIG. 21 3-state image. This color source pattern is what causes the display to change from "1" to "2" to "3", as the viewer moves through the 3 successive lateral viewing positions. Several of these pixels have identical color change patterns, in the change between "1", "2" and "3". FIG. 22B shows all 6 distinct color source patterns required to construct this image, allowing it to change from displaying "1" to "2" to "3". All pixels that are black from all 3 viewing positions can use the same color source, the "BBB" pattern. This includes the first 2 and the last 3 pixels, as well as the 8th.

Auto-Reflective and 3rd Party Techniques

One viewing setting for these reflective displays is where there are no colors in the environment from which to construct an image. For example, the display may oppose a white or other flat color wall, or a background that is much darker or brighter than the viewer in reflection. These displays can be set up to present images constructed entirely of the colors or the high-contrast silhouette of the physical presence of the viewer. Fractured and reassembled components of the viewer will be reflected back to that viewer in the form of reflectively constructed images as the image viewing position. The source color location (the viewer's body, or parts thereof) is almost the same as the viewing position (the viewer's eyes). In a variation on this arrangement, the viewing position can be a third-party position, to which no image is apparent until a pedestrian (typically unsuspecting) or vehicle or cloud enters the source color position, causing images and effects to appear to the third-party viewers.

Considering the case where the viewer and color source are the same position in front of a display, the viewer's silhouette against the flat color background can be used to construct static and animated shapes and images in reflection. For a very simple example, if a square area of the display is reflected to a point 2 feet below a standard viewing position (5.5 feet from the floor, for example, as a standard approximate viewing position, 3.5 feet being the color source position), and the rest of the display were reflected to a similar height 6 feet to the left side, then a viewer standing at that viewing position will see a square in the display. If he were wearing a blue shirt, that square would be blue.

Instead of a single viewer invoking the entire image him/her self, it is possible to require multiple viewers to invoke an image, or to invoke image elements to each separate viewer. In one scenario, spots on the floor can be designated as "key" positions that need to be occupied, to "unlock" or reveal the image, or parts of it to a viewer. If someone with a red shirt were standing 6 feet to the left of the viewer just mentioned, then the apparent blue square mentioned above would now be surrounded by red. In this way the background color is "keyed" to a designated nearby reflection location. This designated reflection location, and the primary viewing location can be marked on the floor so that viewers can collaborate or be required to collaborate (by standing in the designated positions) to reveal the otherwise hidden images, and be instructed where to position themselves in order to reveal the available display imagery. Several such color keys can be built into a given image presentation. For a simple example, the component shapes and colors of a "color by number" style image can be built into a display. This display will not be visible until all the designated color reflection key positions, as marked on the floor, are occupied, thus coloring each color-by-number color, to reveal the reflectively constructed image.

One way to display animation in this type of display is to set up a series of, for example, 20 side-by-side square sections in the display, and present an image in each one of these squares. Let the reflection sources for each of the mirror pixels of all these 20 images be a point just above the viewer's head. Let the remainder of the reflectors in this overall display be targeted to a reflection source a another few inches above. If we assume a generally flat color background behind this viewer, then these images are not visible until the viewer raises a hand, into these color source areas, over his head. Let each image's common reflection point be slightly different from the common reflection point of the other 19 images, laterally offset from each other in the same sequence that the images are laterally arranged on the display. Therefore, each image is visible, for a moment, in sequence, as a result of the viewer's hand being waved overhead. If these images are frames in an animation, then the animation "plays" as a result of the viewer's hand waving overhead. These types of animations don't have to be constrained to blocks, as described above. The sizes and positions of these successively displayable images and changes invoked by hand waving and body movements can be very large, freeform and dramatic, invoking big changes in the generated images. Several such animations can be encoded in many parts of a given display, invoked by different types of body movements, or movements of others in the reflected environment. A display can be set up, according to the above instructions, to present all these animations to a single preferred viewing position. Or it can be set up to display various different animations to various different viewing positions.

Figure 23:
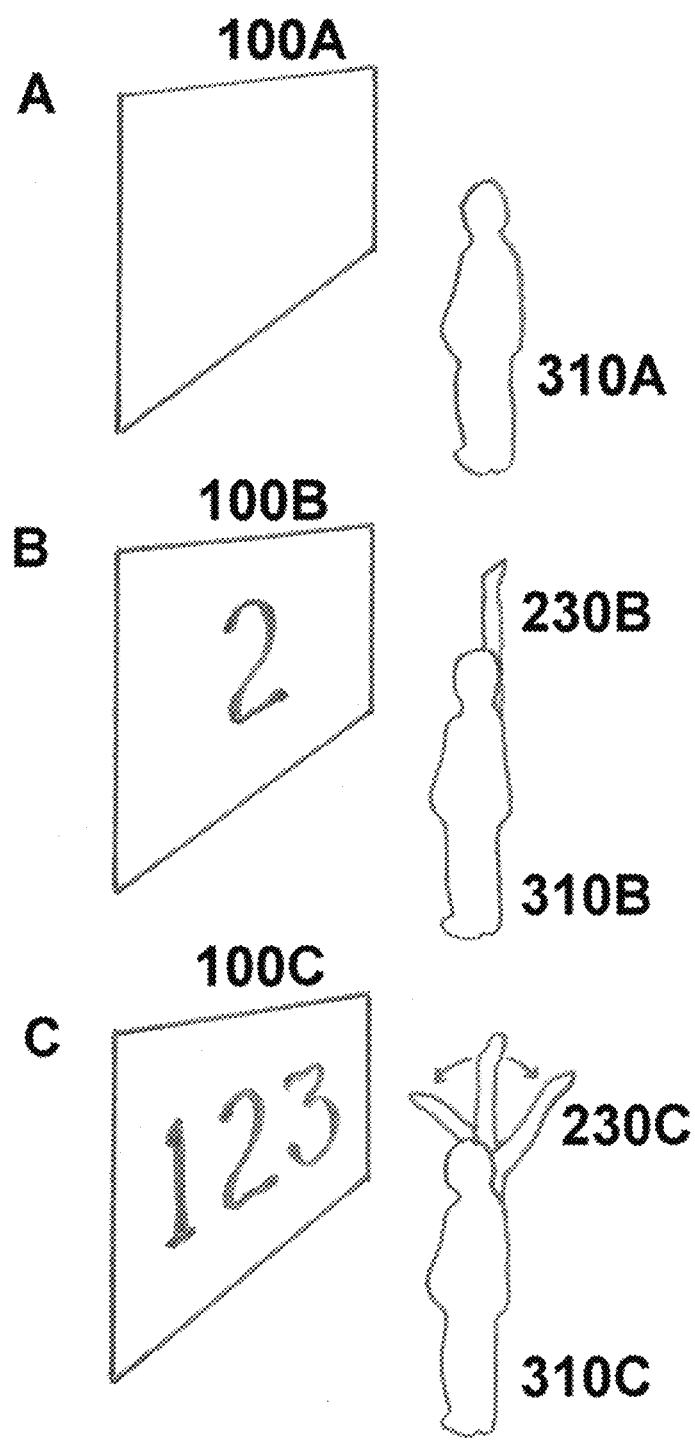
FIG. 23 shows a viewer invoking images by waving a hand through color source areas.

FIG. 23 shows a viewer in a designated viewing position 310A in front of display 100A. No image is seen (as apparent to this viewer), with his arms by his side. With one arm raised, shown in FIG. 23B, one image ("2") becomes visible, because the mirrors of this "2"-shaped section of the image are oriented to that color source position 230B about a foot above the viewing position 310B, which is at average pedestrian eye level. In FIG. 23C, the viewer 310C is waving his hand back and forth overhead 230C, and as a result sees, in sequence, "1, 2, 3, 2, 1, 2, 3, 2 . . . ". Note that from the 3rd party perspective of this diagram nothing is visible on this display, during A, B or C.

A variation of the above animation (of 20 sequential cells, side by side), is to interleave the cells, by using a checkerboard subset of each cell's mirror tile to encode the cell's image, and half overlapping each cell with both neighbor cells. Each cell's checkerboard pattern is the inverse of its neighbor, to allow the interleaving. Frame 1 is encoded into, say, a 3-foot wide region of the "black" checkerboard tiles. Frame 2 is encoded into a 3-foot wide section of the "white" checkerboard tiles. Dozens of frames can be encoded along the length of a long wall, each 3-foot wide alternating white and black checkerboard-resident reflection patterns each 50% overlapping with its two neighbors. Each successive pattern is visible to a progressive viewing position along a viewing path, so that dozens of frames appear in sequence, as the pedestrian walks past the wall. Different frame overlapping/interleaving patterns can be used. For example, using 4 different "checkerboard" colors, 4 overlapping frames can be used. Each frame in this instance only uses ¼ of the mirror tiles for its array pattern, and thus the image or silhouette pattern is shaded more lightly, but it can still be very clearly apparent. With more frames, with closer overlap, the animations presented can be smoother, though fainter, depending on ambient light level compared to the reflected light source intensity. The reflected light source can be hidden from view behind panels or through light baffles or pipes, visible only in reflection in the display, and can therefore be much brighter than the ambient environment.

Another form of animating this type of display is for a given shape to be present in mirror patterns with a form of isolines lines that designate a progression of angle biases of the tiles, towards a color source position. For example, if a circular area of tiles is directed to a position just above the viewer's right shoulder, a slightly raised arm will make this circle apparent. If further tiles around this circle, constituting a larger circle (the next larger isoline) are also directed to a position just above the viewer's right shoulder, but biased just a bit higher, this larger circle will become apparent by that same arm being raised slightly higher. If this pattern is repeated in progressive larger isolines, the complete raise of an arm can make an enlarging circle appear, in 10 coarse steps, or 100 smooth steps, or more. The pattern revealed by the viewer's progressive movements to control the appearance of such an image effect does not have to be as simple as a gradually enlarging circle. It can be extremely complex. The raise of an arm, or of any of many other available other body movements, can invoke the presentation of a long sinewy and detailed vine or curlicue pattern, slowly and elegantly progressing and/or wildly leaping back and forth across the display in astonishing interlocking, freeform, arbitrary or ordered patterns.

Such displays can also be set up to be controlled by viewers wielding designated flag shapes and colors, or throwing large balls in order to place colors (fleetingly) into high color source positions, to make images and effects apparent.

FIG. 24 shows a viewer in front of a small section of a mirror array, just 6×3 tiles, shown here greatly magnified, and much closer to the viewer, for illustration purposes. The example illustrated here is similar to the example shown in FIG. 23. In this case, instead of the viewer invoking multiple distinct images, the viewer invokes finely detailed progressively revealed patterns. In this simple example, the color source for each numbered tile is targeted just slightly offset, in sequence. Tiles numbered "1", for example, are targeted to a color reflection source just to the right of the viewer in FIG. 24. Files numbered "2" are targeted to a color source just above the color source for tiles "1", and so on for tiles labeled up through 12 (as shown) and beyond (as not shown). In FIG. 24A, no tiles are colored 100A, as apparent to the viewer 310A. In FIG. 24B, the viewer's 310B right is slightly raised 230B, thus coloring mirror pixels 1 through 5 100B, in quick succession. In FIG. 24C, the viewer's 310C arm is very slightly raised compared to FIG. 24B, and as a result additional tiles 100C in the progressive reveal of a complex pattern, of which this diagram is a small sampling.

Figure 25:
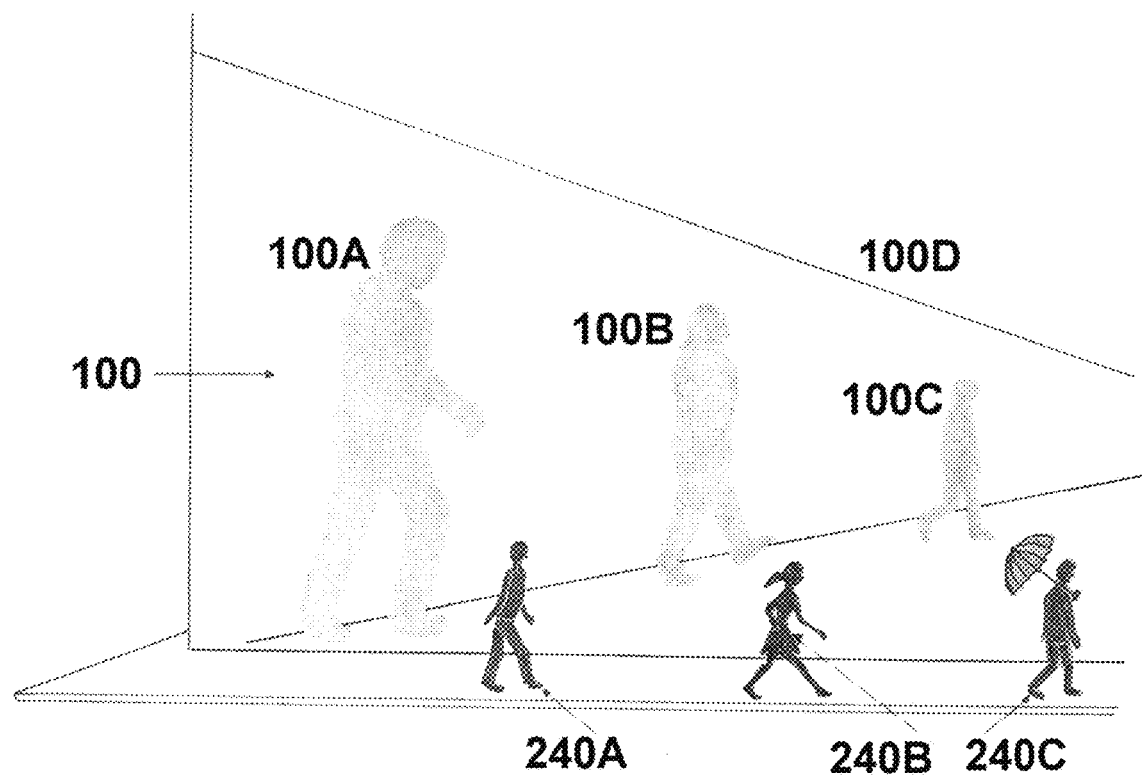
FIG. 25 shows reflected image effects as seen from a 3rd party perspective.

FIG. 25 illustrates the effect where shadow-like shapes are visible to 3rd-party viewers, but not to the pedestrians whose presence is invoking the appearance of the shapes. In the illustrated instance, the central body position of the pedestrian is reflected by all mirrors that constitute each shape, while the surrounding mirrors are angled offset to similarly colored adjacent areas. The shadowy shapes shown are 3

100A, B & C out of perhaps 20, which appear in sequence anytime a pedestrian walks along this wall 100. The reflected image includes a wall 100D, in the actual reflectively reconstructed image. Each progressive reflected "shadow" is smaller than the previous (for a pedestrian moving left to right), giving a fanciful presentation of this shadow figure disappearing into the distance, in this example image sequence.

The first pedestrian 240A is reflected by mirrors towards the viewer in a pattern that forms the largest shadowy FIG. 100A. A single pedestrian walking along this wall will appear as if being followed or paralleled by a large shadowy figure, though only visible from the 3rd party perspective. The effect is constructed by overlaying the desired shadow silhouettes on the wall mirror array, and biasing the mirrors inside the shadow so that their source color position is the position of the pedestrian just in front, and the viewing position is the one 3rd party position.

Figure 26:
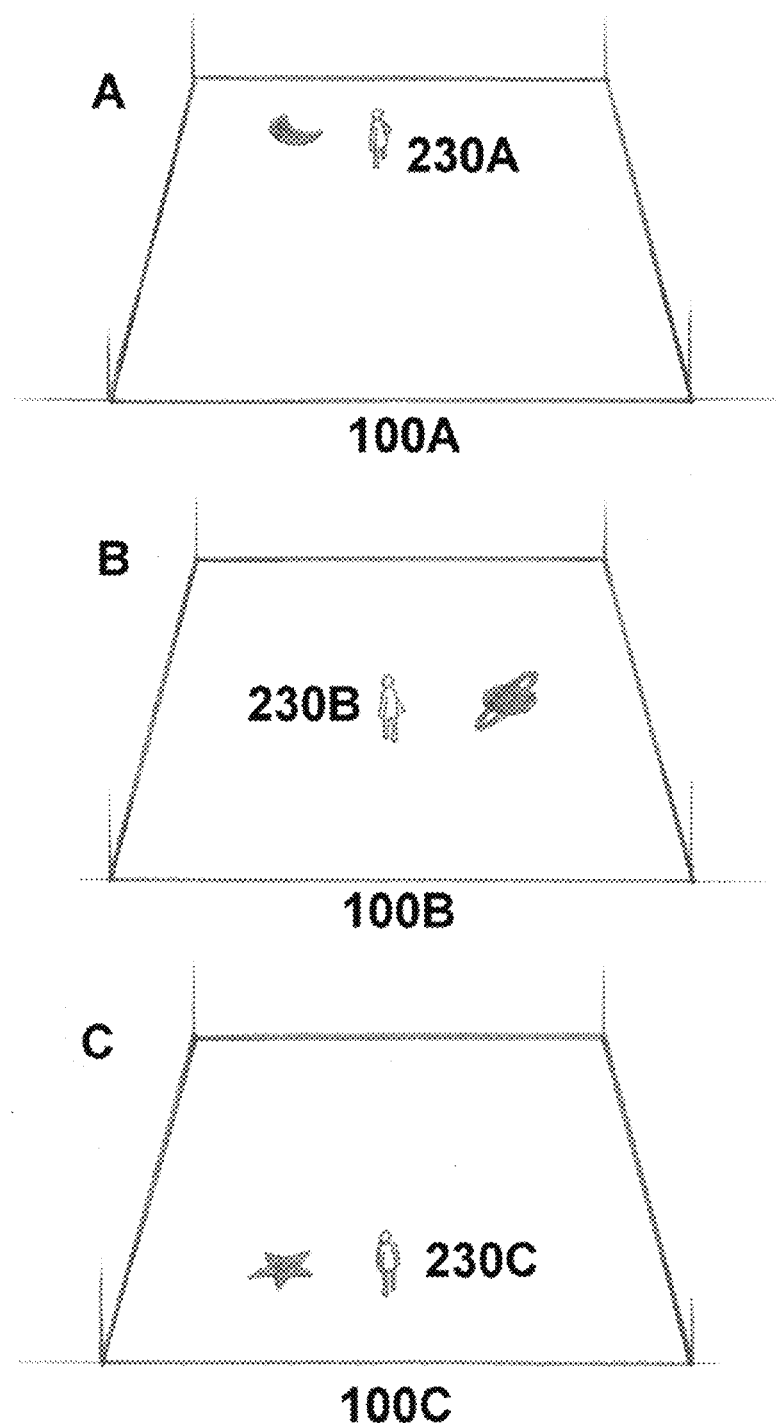
FIG. 26 shows a display seen from above, where the array of mirrors is embedded in the floor.

FIG. 26 shows a display set up similarly to the one shown in FIG. 25, in this case as seen from above, where the array of mirrors 100A, B & C is embedded in the floor and the pedestrian is the color source 230A, B & C for the space-theme graphics.

Interactive Retroreflective Virtual Buttons and Effects

FIG. 27A shows a display 100A which presents an image of a button to a viewer 310A, and text saying "Press Here". FIG. 27B shows that same display as the viewer "presses" the image of the button. The result of this button press is that some mirror pixels in the display are colored by the new position of the outstretched arm 230, presenting a new image 100B to the viewer 310B, the text, "Hi!".

More information can be, of course, potentially displayed to the viewer: The viewer's arm in that extended position can also change the reflective environment in such a way as to, as designed, display a block of text/any other graphic directive or decorative image effects as well. There can be a series of buttons in various positions, revealing progressive levels of information and images, and giving instructions to the viewer regarding how to move his body and extremities in order to reveal additional information.

These displays are made by constructing the hidden text and images from pixels whose color is reflected from body positions that the viewer is directed to adopt, in order to view the information. As in this example, the viewer is instructed to press the button image, which is reflectively constructed from the center of the viewers body, for example. Upon extending his arm, the viewer sees the first hidden message, which is imagery and or text that is constructed from reflections of the viewers now outstretched arm. If the viewer is then instructed to press a 2nd button which has by this method been made to appear to his upper left, then when he presses that button, his new left arm position combined with his new eye position causes additional images to appear, perhaps a $3^{rd}$ button, and so on, for one example of this type of progressive interactivity.

Traffic Control

Figure 28:
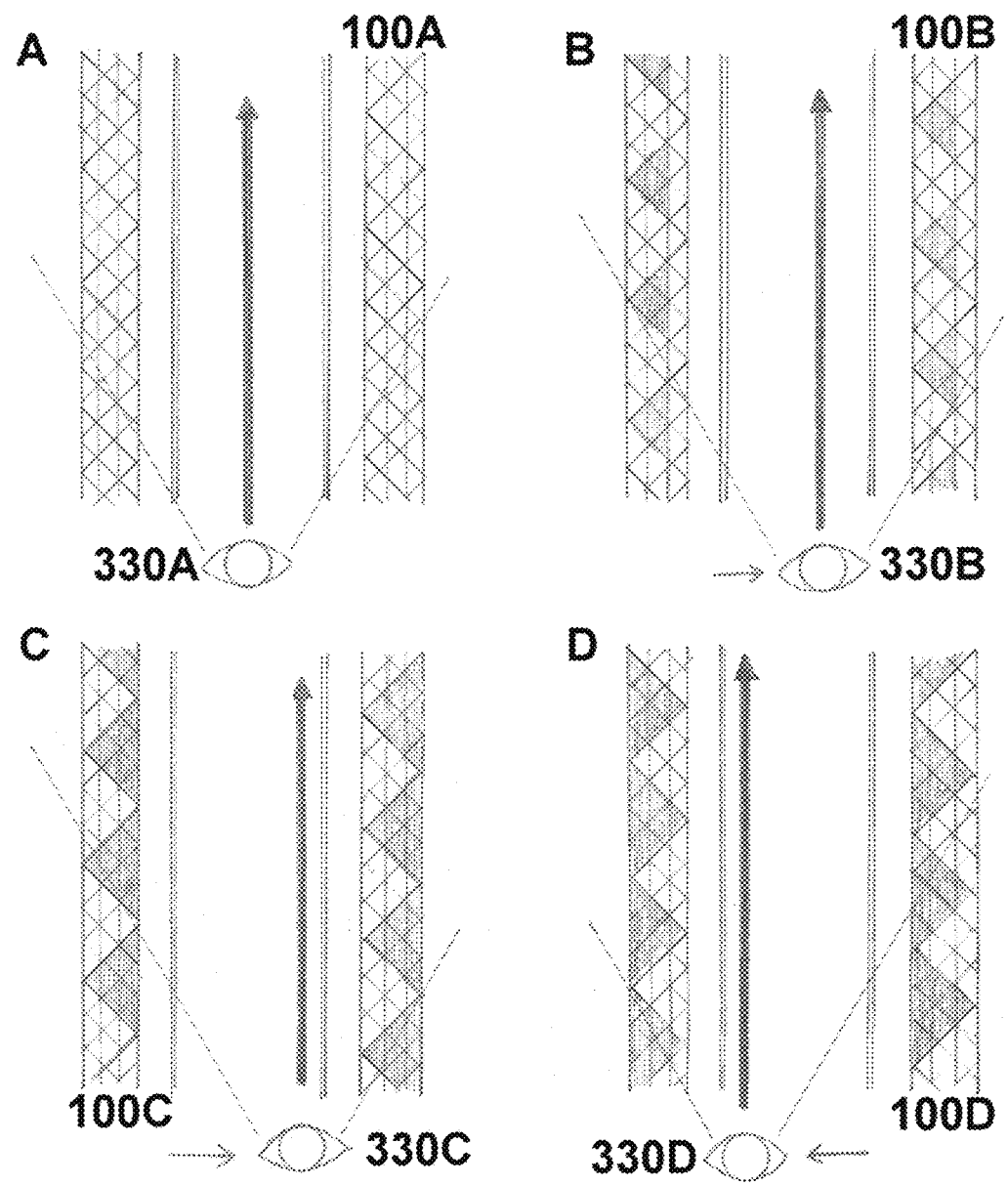
FIG. 28 shows mirror arrays at either side of a vehicle pathway, offering visual steering guidance.

Pedestrian management in many situations:

A wall section (perhaps the top 2 feet of the wall) or a way-finding reflective dot series which remains a given color when you are on the correct path, shades to another color when you veer off the path, as shown in FIG. 28. In large complex buildings, with crossing pathways, this is an alternate to the standard method of painting lines on the floor to help pedestrians find their way through a complex building layout. This method has various advantages, in being more visually attractive, more subtle in some ways, but also more obvious to the intended viewers. Wall section mirror array color indicates the correct path. Directions can be given in the form of "follow red, then blue, then green".

Vehicle guidance including on highway/street and parking space positioning:

This technique can be used in parking garages where the color changes indicate to the driver when he/she is approaching and reaches the perfect parking position. The perfect position will be indicated by different colors for different cars and different driver heights, but that color can be learned. Or, the space can be preconfigured to arrive at a standard "final position" visual indicator color, for a given car, driver position. The system, in this role, is simply a section or series of sections of reflective array, presenting a solid color, for example, which progress through a spectrum as the vehicle moves into the final parking position. The mirrors can also be set to reflect an indicator pattern that signals when the vehicle is not perfectly centered, and thus help guide it back to the center path as it moves into position. The centering indicator can be a caret or arrow that becomes apparent in the color patch, pointing in the direction of the needed steering correction. This technique can be used in the small precise situation of the few final feet of coming to rest position in a parking space, or it can be used in the high-speed situation of a highway. In the highway scenario, it could be implemented as a series of reflectors which may not display color changes as in the garage situation where the reflection source can conveniently be a color pattern. They may, instead, be entirely retro-reflective effects, vectoring the vehicles headlights back to the driver, or can be keyed off of street lighting. This is especially relevant at night, in the highway application, when such point light sources are readily available (headlights, street lamps) and source colors patterns can be more difficult to set up. Though, even at night it can be feasible to set up color gradient sourced effects, to thus give very vivid reflection feedback. On bridges and in tunnels, there are many opportunities (in a given geometry and structure) to set up hidden color source patterns and gradients, as described elsewhere, to drive rich color arrays with highly visible changing dynamics for traffic control purposes.

One of the general techniques here is to have a long thin array, a strip, parallel to the road or bikeway, etc., perhaps at least 10 mirror pixel rows wide. When the vehicle first starts to veer off-path, a single row reflects back toward to viewer. When the vehicle veers further off-path, more rows reflect back, and perhaps in warning colors, and/or brighter, to provide an intuitive obvious indication of how to steer to center the vehicle back into the proper travel lane position. There can be very small reflectors that always reflect back, in a certain recognizable frequency and/or rhythm, when the vehicle is in the correct path. When off-path, several reflective changes can occur, and become progressively more obvious. These changes can include: brighter, more urgent rhythms and warning colors and warning shapes and symbols. The reflection pattern can contain an arrow or caret direction correction indication shape. This again can get progressively more accentuated if the vehicle veers further off path.

FIG. 28 shows long mirror arrays at either side of a vehicle pathway. When a vehicle is correctly positioned at the center of the path FIG. 28A, there is no image or effect reflected to the viewer 330A by this mirror array 100A. If the vehicle veers off the center of the path FIGS. 28B, C & D, the array 100B, C & D displays to the viewer 330B, C & D a caret or arrow effect, indicating to the driver of the vehicle which direction in which to make a steering correction. This type of path positioning feedback system is applicable to street traffic, bike path traffic, airline glide path traffic, cargo loading positioning systems, pedestrian way-finding and similar applications.

This "warning strip" reflector array is set up similarly to how other effects have been described above, where in this case the light source is the traveler's own right or left headlight, and the viewing positions are to the left or the right of the ideally positioned eyes of the bicyclist on the bike path, the driver on the road, etc. When on the ideal travel path, no warning is reflected. When the traveler veers a bit left or right, a few of the pixels are biased as to reflect back, from headlights to eyes, in the shape perhaps for examples of carets pointed in the corrective direction. When the traveler veers a bit further off path, they enter a position where additional mirrors begin to reflect the light sources back to the viewer's eyes, giving a stronger road position corrective warning.

Airport runways are currently lit with primary electronic lighting systems and with standard retro-reflective reflectors. These standard reflectors have the virtue of reflecting airplane headlights shone from a wide range of angles back to the general direction of the light source. Mirror arrays, of the type proposed here, can be set up for traffic control where each individual reflector only reflects to a specific position, or incoming trajectory. Two advantages to this system:

1) The reflection array patterns are visible to only the specific chosen viewing positions and flight paths.

2) The images and array patterns on the ground can progressively and interactively change. For example, should a plane stray from the optimal approach path, these reflectors would reflect back to the pilots' trajectory viewing position arrow images directing them back into the optimal approach path. This would work similarly with automobile traffic and with other applications such as truck/ship docking and watercraft launching and so on.

In another airport scenario, a very bright 3rd position source light can be directed onto a runway and then reflected back to a landing flight path, by an array of 1000s of mirrors, giving very detailed and bright runway visibility, which can be modulated by attenuation of the light source. Several different runway lighting patterns can be available in separate arrays, each lit by different light source positions, each one dedicated to a different type of plane or characteristic flight path.

Another airport application is a runway-resident array of articulated mirrors, which give very fine and interactive control over runway lighting. These mirrors can reflect a given plane's own head lights, and/or a bright point light or point lights in a 3rd position on the ground. Under computer control the array can give not just finely customized and second-by-second updated runway lighting modulation, but also provide a giant text messaging, symbol display to the given pilot upon approach. The runway would, effectively, be a large general purpose display, with lighting and visual communication feedback not possible with current runway lighting methods.

An apparatus in which an ambient color source illuminated array and point light source illuminated array are combined is disclosed. In the apparatus, the large mirrors of the ambient light illuminated array are interspersed with the sub-pixel bundles of the point light illuminated array. The resulting dual-display apparatus array consists of a full color "daylight" display and a monochrome multi-image "night time display".

An apparatus for displaying different text and image content simultaneously to different viewing positions is disclosed. In the apparatus, the angles of mirrors in an array are specified in conjunction with specifying the position and shape of correlated reflected color sources, to produce the specific angle dependent image and text changes.

An apparatus for orienting angles in a mirror array so as to focus and optimize light distribution from one or more light sources towards one or more illumination targets is disclosed. Said mirror angles are optionally under dynamic computer control and directed by a computer vision system which tracks the position of said light sources and illumination targets, and updates the angles of motor actuated mirror tiles in said arrays, to maintain the focus between light source(s) and illumination target(s).

An apparatus consisting of a pattern of reflective angled mirror arrays, which reflects warning patterns towards travelers when they veer off of designated pathways is disclosed. By virtue of the angle patterns of said arrays, the arrays will present to said travelers, if they veer off course by varying degrees, progressively accentuated visual warnings and corrective positioning cues.

An apparatus consisting of pixel elements the tiles of which are both refractive and mirrored. The display combines these two optical elements in various ways, as disclosed.

An apparatus for effecting a degree of concealment of various object surface types is disclosed. The apparatus uses mirror arrays conformed to object surfaces to disguise said objects, by reflecting light in patterns that blend the objects' visual appearance from certain viewing locations to match the background of the object as visible from those viewing locations. Optionally, the apparatus relies upon a computer vision system to track the position of viewers and deduce the background of the object to be hidden, as visible from the viewer's perspective, and optionally actuate motorized versions of the mirror array. Through this method the appearance of the array-covered object is updated and optimized for concealment/camouflage moment by moment, as the ambient source color environment changes, and as the background of the concealed object, with respect to the viewer, changes.

A method for globally updating the image displayed in an angled mirror array is disclosed. In the method, pixel colors of the image intended for display are translated to angled mirror pixel rotational orientation values. These values are then used to set the rotational orientation of half circles cut into a template card. This card is then vibrationally mated to the mirror elements of an angled-rods type of display, to simultaneously set all rods to their designated rotational positions, thus enabling the array to display the intended image.

An apparatus is described which allows viewers of angled mirror array image displays to modulate and control many aspects of the imagery displayed in said arrays. In the apparatus complex relationships of the relative angles of mirrors that form the pixels of the display, reflect back to the viewer of the array his own shape and body movements, to invoke complex visual effects and dynamics.

CONCLUSIONS RAMIFICATIONS AND SCOPE

While the above description contains many specificities, these should not be construed as limitations on the scope of any embodiment, but as exemplifications of the presently preferred embodiments thereof. Many other ramifications and variations are possible within the teachings of the various embodiments. For example, the apparatuses and methods described above may be implemented in other ways that are known in the art that are within the scope of this disclosure. Thus the scope of the invention should be determined by the appended claims and their legal equivalents, and not by the examples given.

What is claimed is:

1. A mirror array image display apparatus comprising:
    a plurality of pixel locations,
    wherein each individual pixel location is comprised of an array structure of N independently angled mirror sub-pixels, where N is a natural number ranging from 2 up to 2,500,
    wherein each said sub-pixel of said individual pixel location is independently configured so as to be lit with respect to a different simultaneous viewing position or at a different viewing time, and
    wherein every one of said individual pixel location's Nth sub-pixel across said image display apparatus are collectively configured to be lit with respect to the same viewing position or viewing time, thereby enabling the display of N independently lit sub-images with respect to said different simultaneously viewing positions or different viewing times.

2. The apparatus of claim 1, wherein multiple sub-images are lit by a single light source moving along a predetermined path, to sequentially present said sub-images to a single viewing position.

3. The apparatus of claim 1, wherein multiple sub-images are lit by a single light source moving along a predetermined path, to sequentially present said sub-images to multiple viewing positions.

4. The apparatus of claim 1, wherein multiple sub-images are lit by multiple independent light sources which are sequentially lit, to sequentially present said sub-images to a single viewing position.

5. The apparatus of claim 1, wherein multiple sub-images are lit by multiple independent light sources, to simultaneously or sequentially present multiple sub-images to multiple viewing positions.

6. The apparatus of claim 1, wherein said viewing positions are configured in a 2-dimensional matrix of adjacent viewing positions.

7. The apparatus of claim 1, integrated at the pixel level with an ambient lit type of mirror display, to produce a hybrid active lit/ambient lit display.

8. A mirror array image display apparatus for presenting conditionally displayed imagery to be viewed from a preferred viewing position, comprising:
    a mirror array image display in which N designated image display subsections derive their reflectively displayed coloration from N separate conditionally colored subsections of said image display's reflectable color environment,
    wherein said N image display subsections are correlated to said N subsections of said image display's reflectable color environment, where N is a natural number ranging from 1 to the total number of pixels in the given display, minus 1,
    wherein said separate conditionally colored subsections of said image display's reflectable color environment derive their conditional coloration from the body and/or body extremity movements of a viewer of said image display in intersection with each of the N said separate subsections of said image display's reflectable color environment,
    wherein said movements of said viewer's body and/or body extremities and their intersection with each of the N said separate subsections of said image display's reflectable color source locations causes display color changes in each of said N said display's correlated subsections,
    wherein each said N image display subsection is differentiated from all other of said N image display subsections by virtue of the angle settings of the mirror tiles contained therein, and
    wherein said differentiated image display subsections are configured in a checkerboard interleaved pattern, an isolines zones pattern or a method of blocking out arbitrary display sub-sections.

9. The apparatus of claim 8, wherein said conditionally colored image subsections derive their coloration from conditional changes in the reflectable color environment not under the control of the image viewer.

10. The apparatus of claim 8, wherein multiple viewers are required to collaboratively invoke said conditionally colored image.

11. The apparatus of claim 8, wherein multiple viewers are required to collaboratively invoke said conditionally colored image, as directed by designated key positions.

12. The apparatus of claim 8, wherein said conditionally colored image subsections are displayed to multiple viewing positions.

* * * * *